United States Patent
Barth et al.

(10) Patent No.: US 10,560,334 B2
(45) Date of Patent: Feb. 11, 2020

(54) DETERMINING AND IMPLEMENTING EGRESS PEER ENGINEERING AND/OR INGRESS PEER ENGINEERING FOR DESTINATIONS IN A NETWORK

(71) Applicant: Juniper Networks, Inc., Sunnyvale, CA (US)

(72) Inventors: Jonathan C. Barth, Collegeville, PA (US); Anshu Verma, San Jose, CA (US); Sunanda Kommula, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/024,325

(22) Filed: Jun. 29, 2018

(65) Prior Publication Data
US 2020/0007399 A1    Jan. 2, 2020

(51) Int. Cl.
*H04L 12/24*   (2006.01)
*H04L 12/813*  (2013.01)
(Continued)

(52) U.S. Cl.
CPC ...... *H04L 41/0896* (2013.01); *H04L 41/0813* (2013.01); *H04L 41/0823* (2013.01);
(Continued)

(58) Field of Classification Search
CPC ..... H04W 28/16; H04W 28/18; H04W 28/20; H04W 28/22; H04W 28/26;
(Continued)

(56) References Cited

U.S. PATENT DOCUMENTS

| | | | |
|---|---|---|---|
| 2007/0019544 A1* | 1/2007 | Ashwood Smith | ..... H04L 45/12 370/230 |
| 2013/0282897 A1* | 10/2013 | Siegel | ................. H04L 43/0876 709/224 |
| 2018/0026895 A1 | 1/2018 | Wang et al. | |

OTHER PUBLICATIONS

Ho K-H., et al., "Multi-objective Egress Router Selection Policies for Inter-domain Traffic with Bandwidth Guarantees", Networking, Apr. 8, 2004, Networking Technologies, Services and Protocols, Performance of Computer and Communication Networks, Mobile and Wireless Communications, Lecture Notes in Computer Science (LNCS), Springer-Verlag, Berlin/Heidelberg, pp. 271-283.
(Continued)

*Primary Examiner* — Dady Chery
(74) *Attorney, Agent, or Firm* — Harrity & Harrity, LLP

(57) ABSTRACT

A device receives policy information associated with configuring a network, and receives network information associated with the network. The device determines, based on the network information, that the policy information is associated with implementation of egress peer engineering techniques for the network, and identifies, based on the network information, a first set of destinations of the network that satisfies a particular threshold bandwidth. The device assigns costs and bandwidths to the first set of destinations based on the policy information, and monitors bandwidth utilization by the first set of destinations. The device processes information associated with the first set of destinations, with a model, based on the bandwidth utilization and based on the egress peer engineering techniques, to generate a first set of ranked destinations, and causes traffic in the network to be managed based on the first set of ranked destinations and the policy information.

20 Claims, 18 Drawing Sheets

(51) Int. Cl.
   *H04L 12/26* (2006.01)
   *H04L 12/803* (2013.01)
(52) U.S. Cl.
   CPC ...... *H04L 41/0893* (2013.01); *H04L 43/0876* (2013.01); *H04L 47/20* (2013.01); *H04L 47/125* (2013.01)
(58) Field of Classification Search
   CPC ............ H04L 43/0876; H04L 43/0882; H04L 43/0888; H04L 43/0894; H04L 12/5601; H04L 45/54; H04L 45/745; H04L 49/3009; H04L 49/309
   See application file for complete search history.

(56) References Cited

OTHER PUBLICATIONS

Partial European Search Report for Application No. EP19165971.3, dated Oct. 30, 2019, 18 pages.
Sairam A.S., et al., "Load Balancing Inbound Traffic in Multihomed Stub Autonomous Systems", Communication Systems and Networks and Workshops. Jan. 5, 2009, Comsnets 2009, First International IEEE, Piscataway, United States, pp. 1-10.

\* cited by examiner

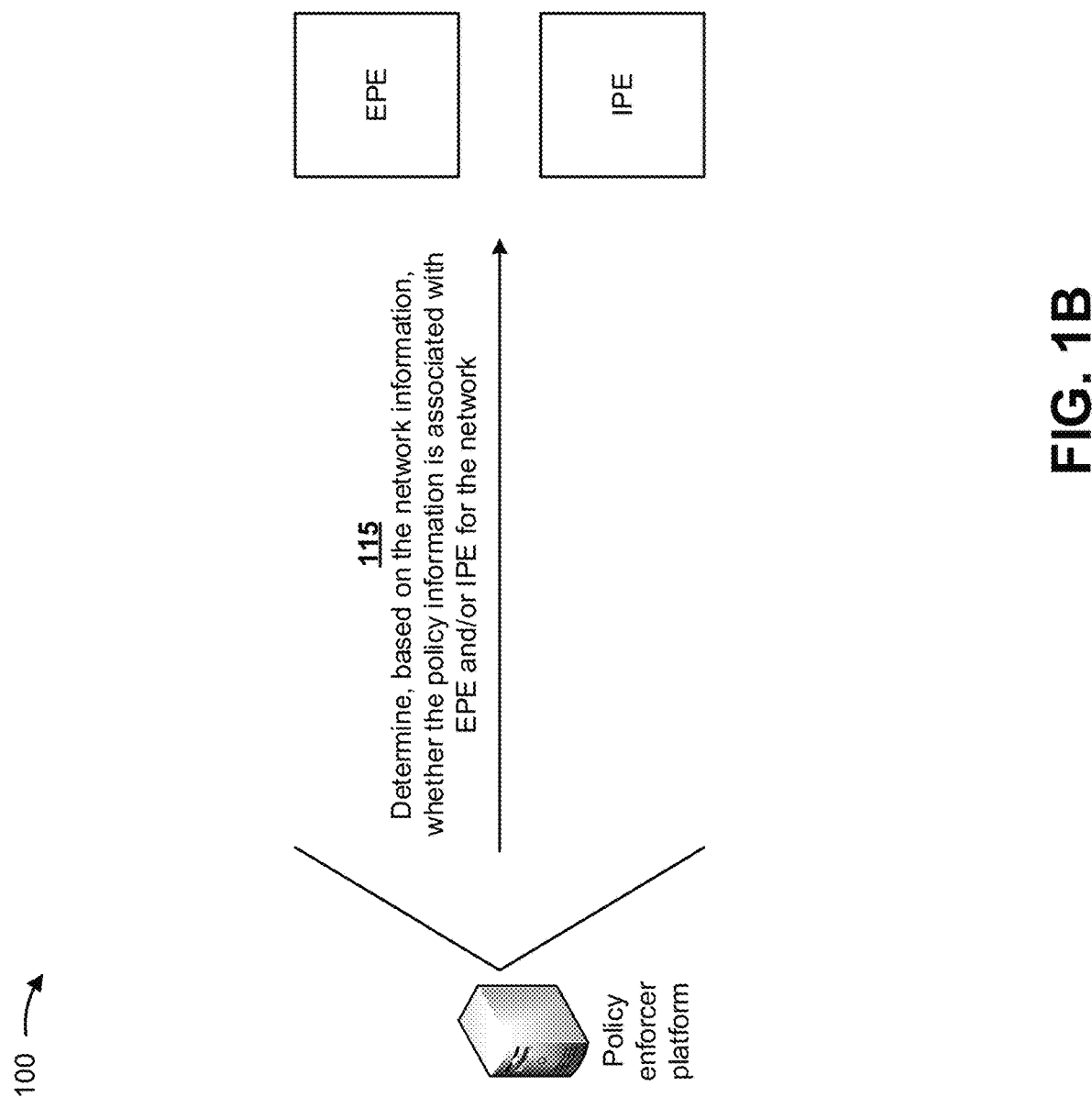

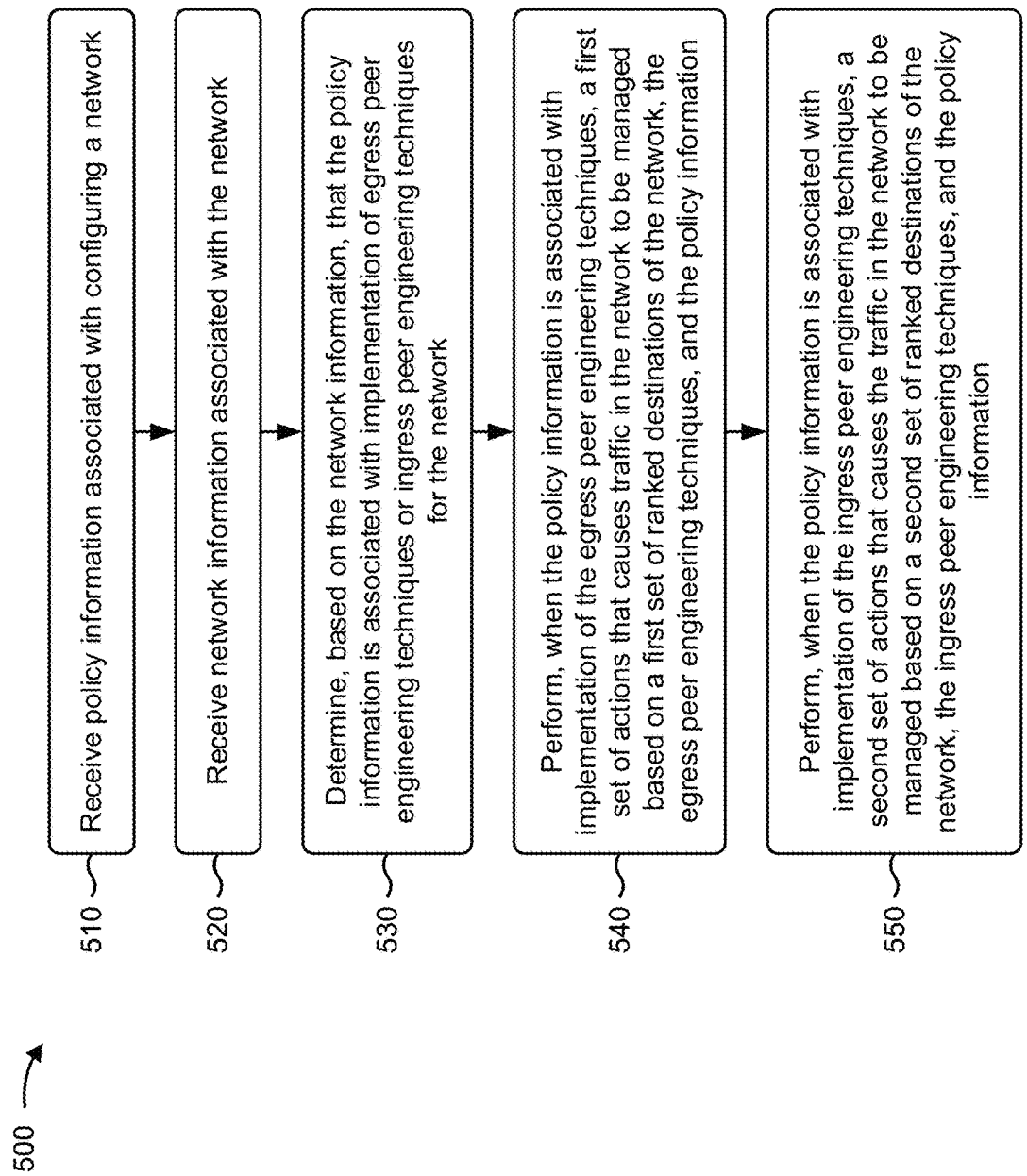

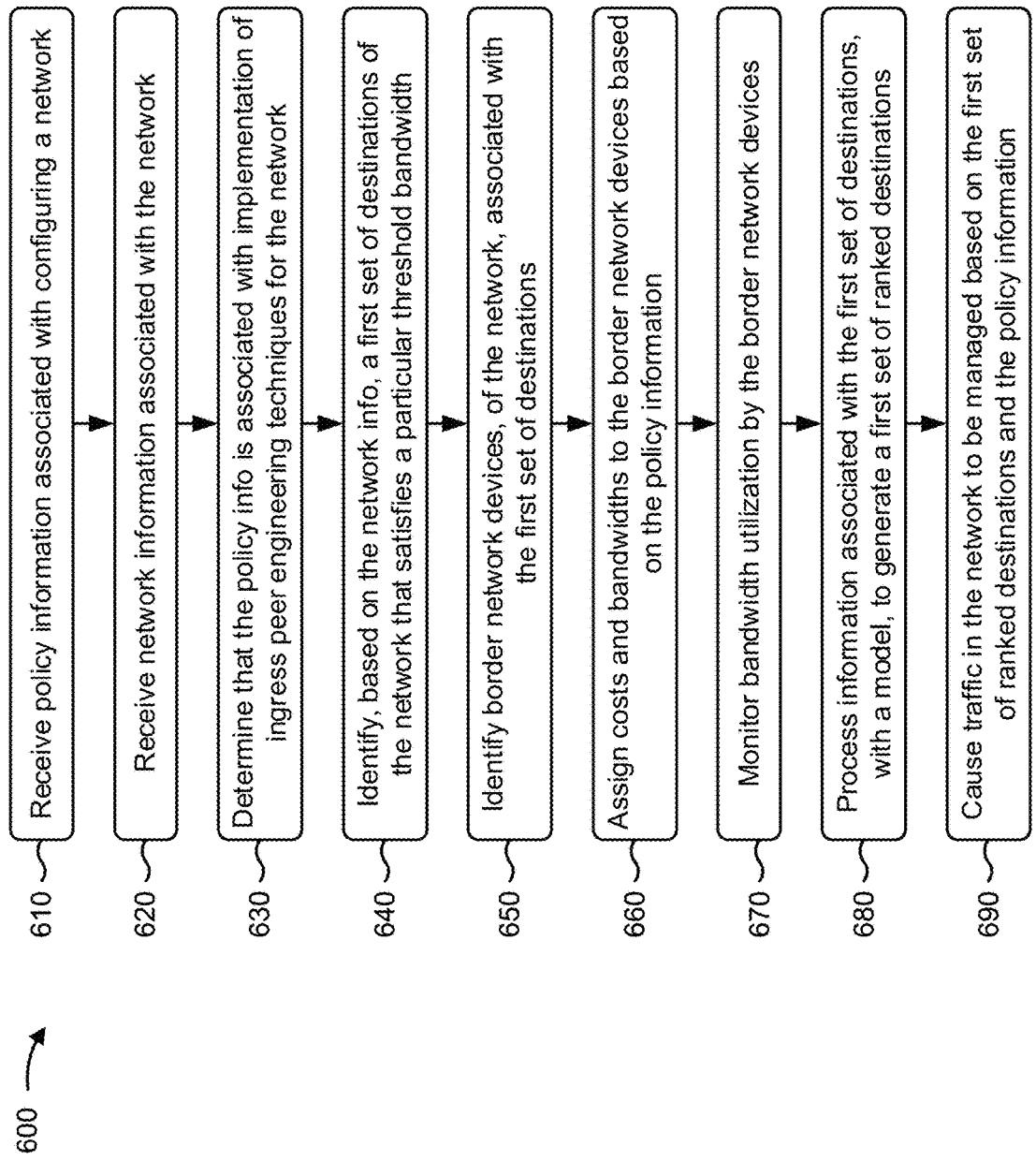

DETERMINING AND IMPLEMENTING EGRESS PEER ENGINEERING AND/OR INGRESS PEER ENGINEERING FOR DESTINATIONS IN A NETWORK

BACKGROUND

Egress peer engineering (EPE) allows a network to instruct an ingress network device (e.g., a router) to direct traffic towards a specific egress network device (e.g., a router) and a specific external interface to reach a particular destination outside of the network. Egress peer engineering allows for the selection of a best advertised egress route and mapping of the selected best route to a specific egress point. Ingress peer engineering (IPE) enables a network to match destinations, announced by the network, with an internal core capacity in order to deliver traffic to the destinations while minimizing, controlling, and optimizing the internal core capacity.

SUMMARY

According to some implementations, a device may include one or more memories, and one or more processors to receive policy information associated with configuring a network, and receive network information associated with the network. The one or more processors may determine, based on the network information, that the policy information is associated with implementation of egress peer engineering techniques for the network, and may identify, based on the network information, a first set of destinations of the network that satisfies a particular threshold bandwidth. The one or more processors may assign costs and bandwidths to the first set of destinations based on the policy information, and may monitor bandwidth utilization by the first set of destinations. The one or more processors may process information associated with the first set of destinations, with a model, based on the bandwidth utilization and based on the egress peer engineering techniques, to generate a first set of ranked destinations, and may cause traffic in the network to be managed based on the first set of ranked destinations and the policy information.

According to some implementations, a non-transitory computer-readable medium may store instructions that include one or more instructions that, when executed by one or more processors of a device, cause the one or more processors to receive policy information associated with configuring a network, and receive network information associated with the network. The one or more instructions may cause one or more processors to determine, based on the network information, that the policy information is associated with implementation of egress peer engineering techniques or ingress peer engineering techniques for the network. The one or more instructions may cause one or more processors to perform, when the policy information is associated with implementation of the egress peer engineering techniques, a first set of actions that causes traffic in the network to be managed based on a first set of ranked destinations of the network, the egress peer engineering techniques, and the policy information, and/or perform, when the policy information is associated with implementation of the ingress peer engineering techniques, a second set of actions that causes the traffic in the network to be managed based on a second set of ranked destinations of the network, the ingress peer engineering techniques, and the policy information.

According to some implementations, a method may include receiving policy information associated with configuring a network, and receiving network information associated with the network. The method may include determining, based on the network information, that the policy information is associated with implementation of ingress peer engineering techniques for the network, and identifying, based on the network information, a first set of destinations of the network that satisfies a particular threshold bandwidth. The method may include identifying border network devices, of the network, associated with the first set of destinations, and assigning costs and bandwidths to the border network devices based on the policy information. The method may include monitoring bandwidth utilization by the border network devices, and processing information associated with the first set of destinations, with a model, based on the bandwidth utilization by the border network devices and based on the ingress peer engineering techniques, to generate a first set of ranked destinations. The method may include causing traffic in the network to be managed based on the first set of ranked destinations and the policy information.

BRIEF DESCRIPTION OF THE DRAWINGS

FIGS. 1A-1M are diagrams of an example implementation described herein.

FIG. 5 is a flow chart of an example process for determining and implementing egress peer engineering and/or ingress peer engineering for destinations in a network.

FIG. 6 is a flow chart of an example process for determining and implementing egress peer engineering and/or ingress peer engineering for destinations in a network.

DETAILED DESCRIPTION

The following detailed description of example implementations refers to the accompanying drawings. The same reference numbers in different drawings may identify the same or similar elements.

Implementing egress peer engineering and/or ingress peer engineering requires an operator to log into a routing infrastructure of a network and to input several very complicated commands. Unfortunately, this often leads to instability and load balancing issues in the network. Entities may wish to utilize egress peer engineering and/or ingress peer engineering to control costs associated with a network. However, protocols (e.g., a network configuration protocol (NETCONF), a border gateway protocol (BGP), a segment routing protocol, a path computation element communication protocol (PCEP), and/or the like) associated with egress peer engineering and/or ingress peer engineering may be difficult to manage. Furthermore, it is difficult to convert a network policy into network protocol commands without operator intervention, and network protocols do not understand costs associated with usage of network resources (e.g., network devices, links, interfaces, and/or the like).

Some implementations described herein provide a policy enforcer platform that determines and implements egress peer engineering and/or ingress peer engineering for destinations in a network. For example, the policy enforcer platform may receive policy information associated with configuring a network, and may receive network information associated with the network. The policy enforcer platform may determine, based on the network information, that the policy information is associated with implementation of egress peer engineering techniques or ingress peer engineering techniques for the network. The policy enforcer platform may perform, when the policy information is associated with implementation of the egress peer engineering techniques, a first set of actions that causes traffic in the network to be managed based on a first set of ranked destinations of the network, the egress peer engineering techniques, and the policy information. The policy enforcer platform may perform, when the policy information is associated with implementation of the ingress peer engineering techniques, a second set of actions that causes the traffic in the network to be managed based on a second set of ranked destinations of the network, the ingress peer engineering techniques, and the policy information.

In this way, the policy enforcer platform may automate a process for determining and implementing egress peer engineering and/or ingress peer engineering for destinations in a network, which may remove human subjectivity and waste from the process, and which may improve speed and efficiency of the process and conserve computing resources.

Figure 1A:
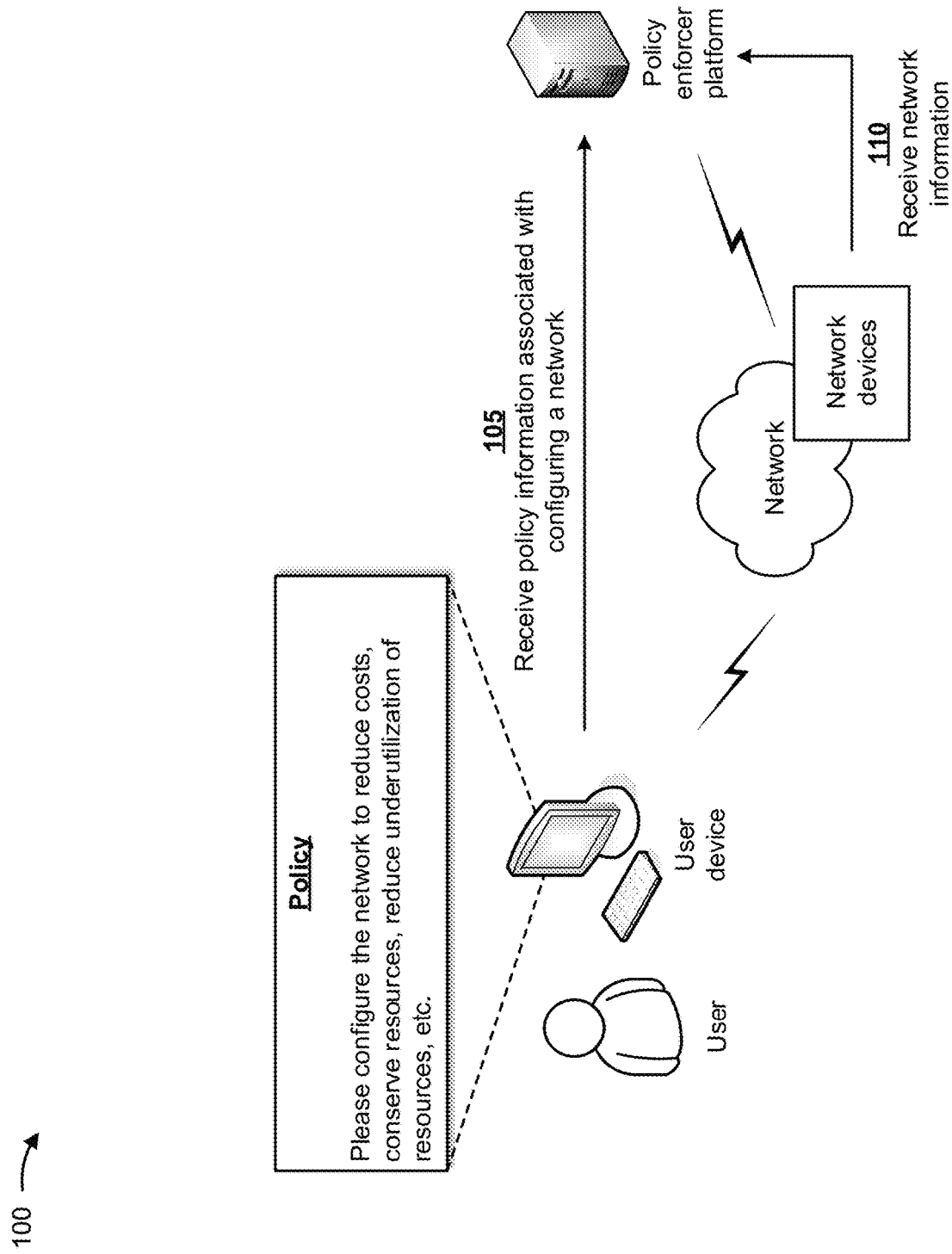

FIGS. 1A-1M are diagrams of an example implementation 100 described herein. As shown in FIG. 1A, a user device may be associated with a user, a policy enforcer platform, and a network. As further shown in FIG. 1A, the network may include multiple network devices, and the user (e.g., via a user interface provided by the user device to the user) may provide, to the user device, policy information associated with configuring the network. For example, as shown in FIG. 1A, the policy may indicate that the network is to be configured "to reduce costs, conserve resources, reduce underutilization of resources, etc." In some implementations, the policy may include a security policy (e.g., a firewall policy, an intrusion detection system (IDS) policy, an intrusion prevention system (IPS) policy, and/or the like) to be applied to the network, a business policy (e.g., a record retention policy, a data access policy, a policy to reduce network costs, a policy to conserve network resources, a policy to reduce underutilization of network resources, and/or the like) to be applied to the network, a network policy (e.g., a network authorization policy, an ingress policy, an egress policy, and/or the like) to be applied to the network, combinations of policies to be applied to the network, and/or the like.

As further shown in FIG. 1A, and by reference number 105, the policy enforcer platform may receive, from the user device, policy information associated with configuring the network. In some implementations, the policy information may include information identifying a security policy to be applied to the network, a business policy to be applied to the network, a network policy to be applied to the network, combinations of policies to be applied to the network, and/or the like.

As further shown in FIG. 1A, and by reference number 110, the policy enforcer platform may receive, from the network, network information associated with the network. In some implementations, the network information may include information identifying the devices (e.g., the network devices) associated with the network. For example, the network information may include information identifying manufacturers, models, device identifiers, throughputs, bandwidths, network addresses, and/or the like of the network devices associated with the network, information identifying hardware provided in the network devices associated with the network, information identifying software provided in the network devices associated with the network, information identifying traffic handled by the network devices associated with the network, information identifying bandwidth utilization by the network devices associated with the network, and/or the like.

As shown in FIG. 1B, and by reference number 115, the policy enforcer platform may determine, based on the network information, whether the policy information is associated with egress peer engineering and/or ingress peer engineering for the network. For example, if the network is associated with an upstream service provider (e.g., a video-on-demand provider, a search engine provider, and/or the like), the network information may indicate that traffic in the network is associated with the upstream service provider. In such an example, the policy enforcer platform may determine that the policy information is associated with egress peer engineering since most of the traffic of the network may be outbound traffic. In another example, if the network is associated with a last mile service provider (e.g., a cable television provider, a digital voice provider, an Internet service provider, and/or the like), the network information may indicate that traffic in the network is associated with the last mile service provider. In such an example, the policy enforcer platform may determine that the policy information is associated with ingress peer engineering since most of the traffic of the network may be inbound traffic.

In some implementations, the policy enforcer platform may process the network information, with one or more artificial intelligence models, to determine whether the policy information is associated with egress peer engineering and/or ingress peer engineering for the network. For example, the one or more artificial intelligence models may analyze the network information and/or the policy information, and may output information indicating whether egress peer engineering and/or ingress peer engineering should be applied to the network. In some implementations, the one or more artificial intelligence models may include one or more of a support vector machine model, an artificial neural network model, a data mining model, a pattern discovery model, and/or the like.

A support vector machine model may include a supervised learning model with one or more associated learning algorithms that analyze data used for classification and regression analysis (e.g., to determine whether the policy information is associated with egress peer engineering and/or ingress peer engineering for the network). Given a set of training examples, each training example being marked as belonging to one or the other of two categories (e.g., egress peer engineering and/or ingress peer engineering), a training method of the support vector machine model builds a model that assigns new examples to one category or the other. The support vector machine model is a representation of examples as points in space, mapped so that the examples of separate categories are divided by a clear gap that is as wide as possible. New examples are then mapped into that same space and predicted to belong to a category based on which side of the gap the new examples fall.

An artificial neural network model may include a model that uses an artificial neural network (e.g., to determine whether the policy information is associated with egress peer engineering and/or ingress peer engineering for the network). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which is connected. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

A data mining model may include a model that performs anomaly detection (e.g., outlier, change, and/or deviation detection) to identify unusual data records of interest or data errors that require further investigation, association rule learning (e.g., dependency modeling) to search for relationships between variables, clustering to discover groups and/or structures in data, such as the network information and the policy information, that are similar without using known structures in the data, classification to generalize known structure to apply to new data, regression to identify a function that models the data with the least error, summarization to provide a more compact representation of the data set, including visualization and report generation, and/or the like.

A pattern discovery model may include a data mining technique, such as sequential pattern mining, that determines whether the policy information is associated with egress peer engineering and/or ingress peer engineering for the network. Sequential pattern mining is a type of structured data mining that seeks to identify statistically relevant patterns between data examples where the values are delivered in a sequence. Sequential pattern mining may be classified as string mining (e.g., which is based on string processing models), and/or item set mining (e.g., which is based on association rule learning). String mining deals with a limited alphabet for items that appear in a sequence, but where the sequence itself may be very long. Item set mining deals with discovering frequent item sets, and an order in which the frequent item sets appear.

In some implementations, the policy enforcer platform may utilize one or more of the artificial intelligence models, and may utilize best results determined by one of the artificial intelligence models. In some implementations, the policy enforcer platform may utilize a plurality of the artificial intelligence models, and may aggregate the results determined by the plurality of artificial intelligence models.

Figure 1C:
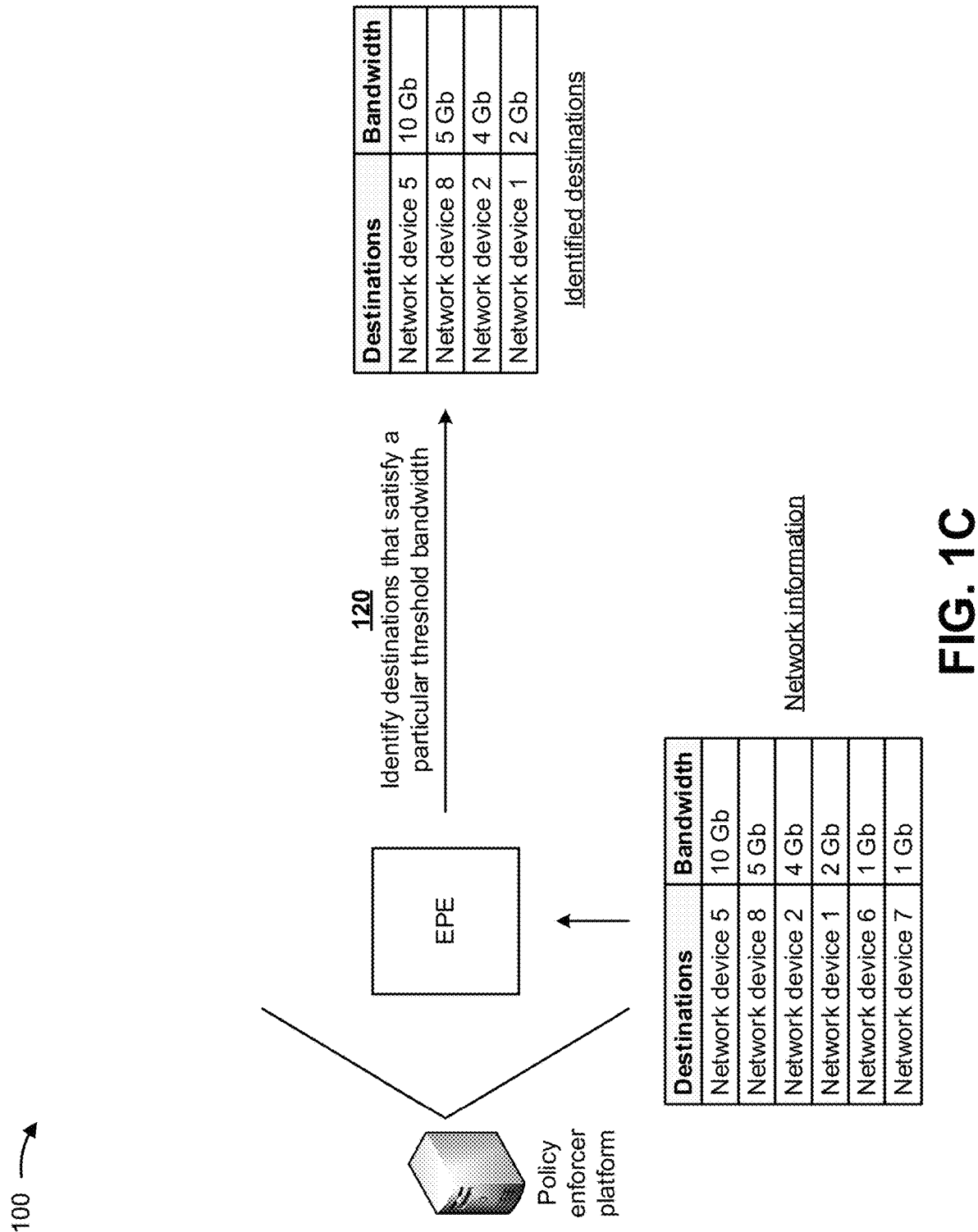

As shown in FIG. 1C, if the policy enforcer platform determines that the policy information is associated with egress peer engineering, the policy enforcer platform may implement egress peer engineering techniques with the network information. In some implementations, the egress peer engineering techniques may instruct an ingress network device to direct traffic towards a specific egress network device and a specific external interface to reach a particular destination outside of the network, may allow for the selection of a best advertised egress route and mapping of the selected best route to a specific egress point, and/or the like. In some implementations, the network information may include information identifying destinations of the network (e.g., network device 5, network device 8, network device 2, network device 1, network device 6, network device 7, and/or the like), bandwidth utilization (e.g., for sending or receiving traffic) by the destinations (e.g., ten gigabits (Gb), five Gb, four Gb, two Gb, one Gb, and/or the like), and/or the like.

As further shown in FIG. 1C, and by reference number 120, the policy enforcer platform may identify destinations of the network that satisfy a particular bandwidth threshold. In some implementations, the particular bandwidth threshold may be selected so that a relatively small quantity (e.g., fifteen percent, twenty percent, and/or the like) of the destinations are identified by the policy enforcer platform. The particular bandwidth threshold may be selected since the identified destinations may handle a majority (e.g., greater than eighty percent) of the traffic in a network. By identifying a small quantity of destinations, the policy enforcer platform may not need to process the remaining entries in the network information, which may include hundreds, thousands, millions, etc. of entries. In this way, the policy enforcer may conserve resources (e.g., processing resources, memory resources, and/or the like) that would otherwise be wasted processing entries that do not represent the majority of the traffic in the network. For example, as further shown in FIG. 1C, based on the particular bandwidth threshold, the policy enforcer platform may identify network device 5, network device 8, network device 2, and network device 1 as the identified destinations of the network.

Figure 1D:
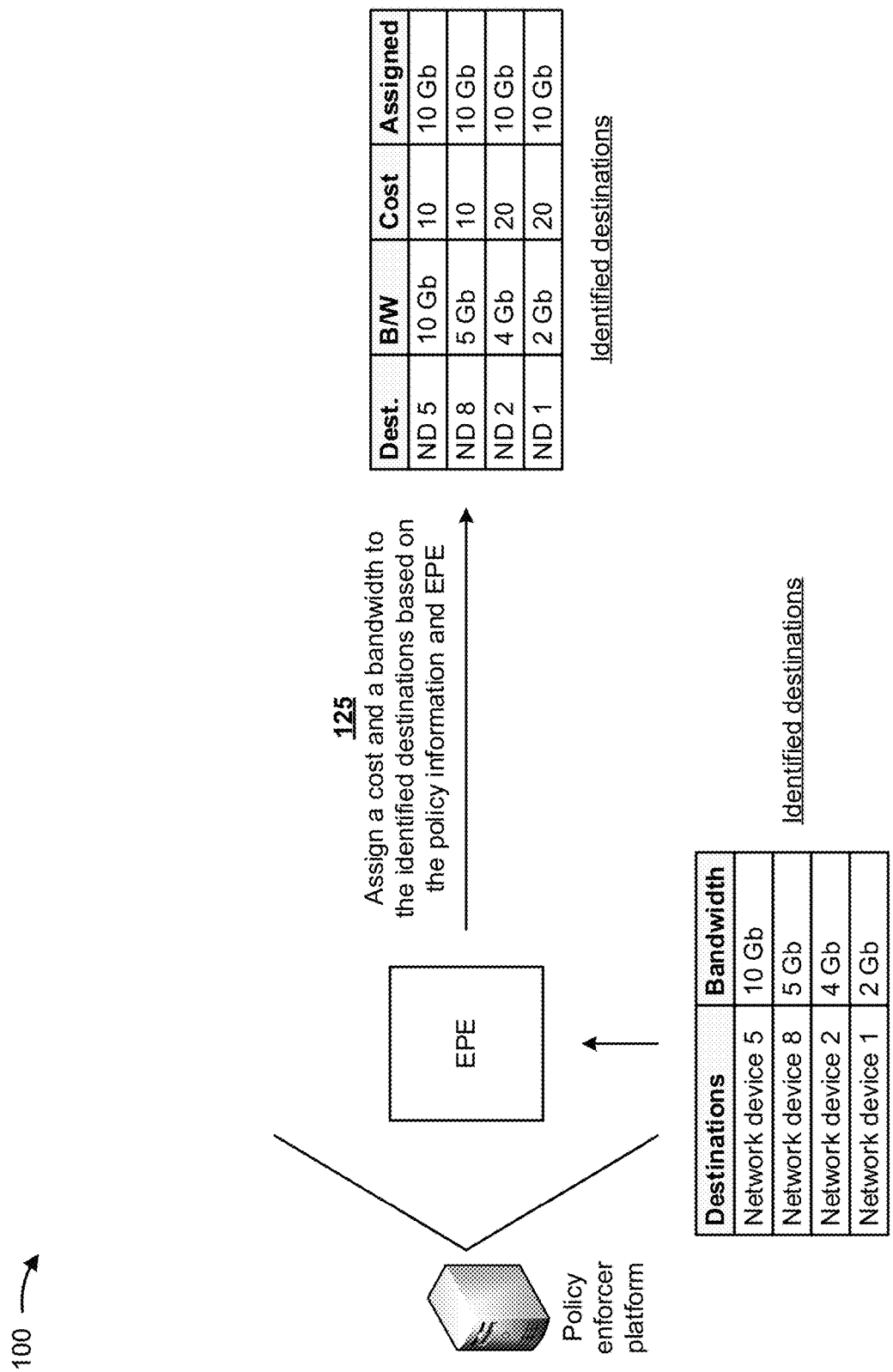

As shown in FIG. 1D, the policy enforcer platform may utilize the egress peer engineering techniques with the identified destinations. As further shown in FIG. 1D, and by reference number 125, the policy enforcer platform may assign a cost and a bandwidth to the identified destinations based on the policy information. In some implementations, the costs and the bandwidths assigned to the identified destinations may be determined based on the policy information. In some implementations, the policy enforcer platform may utilize machine learning models (e.g., supervised learning models, unsupervised learning models, reinforcement learning models, and/or the like) to monitor past behavior in the network and, from the past behavior, may determine how to best assign costs and bandwidths to the identified destinations.

For example, if the policy information indicates a desire to reduce network costs, the costs assigned to the identified destinations may be defined to reduce network costs. In another example, if the policy information indicates a desire to reduce underutilization of network resources, the bandwidths assigned to the identified destinations may be defined to reduce underutilization of network resources. As further shown in FIG. 1D, the policy enforcer platform may assign a cost of ten (e.g., dollars) to network device 5 and network device 8, may assign a cost of twenty to network device 1 and network device 2, and may assign a bandwidth of ten Gb to network device 5, network device 8, network device 1, and network device 2.

Figure 1E:
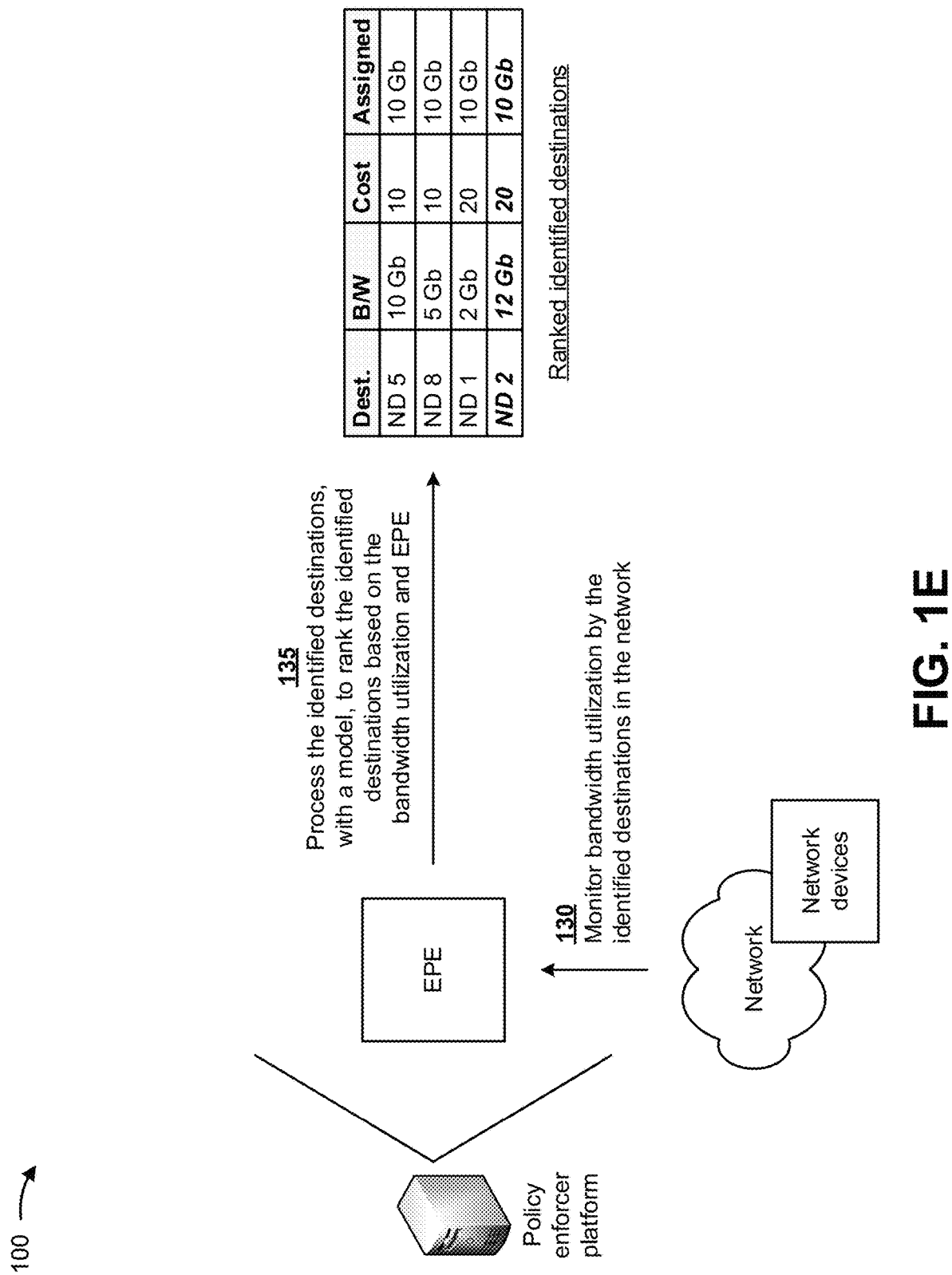

As shown in FIG. 1E, and by reference number 130, the policy enforcer platform may monitor bandwidth utilization by the identified destinations in the network. For example, based on monitoring the bandwidth utilized by the identified destinations, the policy enforcer platform may determine that network device 5 utilizes ten Gb of bandwidth, network device 8 utilizes five Gb of bandwidth, network device 1 utilizes two Gb of bandwidth, and network device 2 utilizes twelve Gb of bandwidth (but previously utilized only four Gb of bandwidth, as shown in FIG. 1D).

As further shown in FIG. 1E, and by reference number 135, the policy enforcer platform may process information associated with the identified destinations, with a model, to rank the identified destinations based on the bandwidth utilization and the egress peer engineering techniques. As shown in FIG. 1E, the policy enforcer platform may rank the identified destinations to generate ranked identified destinations. For example, since the bandwidth utilization of network device 2 is twelve Gb (e.g., which is greater than the assigned bandwidth of ten Gb and may create load balancing issues for the network), the policy enforcer platform may rank network device 2 at a lowest position of the ranked identified destinations.

In some implementations, the model may include a least-fill model, a load-balancing model, a most-fill model, and/or the like. The least-fill model may include a model that accepts a new path (e.g., defined by the ranked identified destinations) through a network if the new path reduces congestion in the network by at least a particular percent (e.g., ten percent) aggregated over all links traversed by the new path. In some implementations, the least-fill model may select a path (e.g., defined by the ranked identified destinations) through network with a most available bandwidth (e.g., with a largest available bandwidth ratio). An available bandwidth ratio of a link is an available bandwidth on a link divided by a maximum reserved bandwidth on the link.

The load-balancing model may include a model that is based on a weighted utilization (e.g., a load) of ports connected to a network device (e.g., one of the ranked identified destinations). When a link load rebalance occurs, the load-balancing model may minimize disruption by logging out only sessions that need to be moved to other links to balance a link load. To further minimize disruption, the load-balancing model may log out sessions with fewest dependencies. When the sessions log in again, the sessions may be placed on interfaces in a manner that balances the link load of the network device.

The most-fill model may include a model that prefers a path (e.g., defined by the ranked identified destinations) through a network with a least available bandwidth (e.g., with a minimum available bandwidth ratio). The minimum available bandwidth ratio of a path (e.g., defined by the ranked identified destinations) may include a smallest available bandwidth ratio belonging to any of the links in the path.

In some implementations, the policy enforcer platform may utilize one or more of the least-fill model, the load-balancing model, and/or the most-fill model, and may utilize best results determined by one of the least-fill model, the load-balancing model, and/or the most-fill model. In some implementations, the policy enforcer platform may utilize a plurality of the least-fill model, the load-balancing model, and the most-fill model, and may aggregate the results determined by the plurality of models. In some implementations, the policy enforcer platform may utilize the one or more of the least-fill model, the load-balancing model, and/or the most-fill model and the rankings of the identified destinations, to determine paths through the network that satisfy the one or more of the least-fill model, the load-balancing model, and/or the most-fill model and the policy information.

Figure 1F:
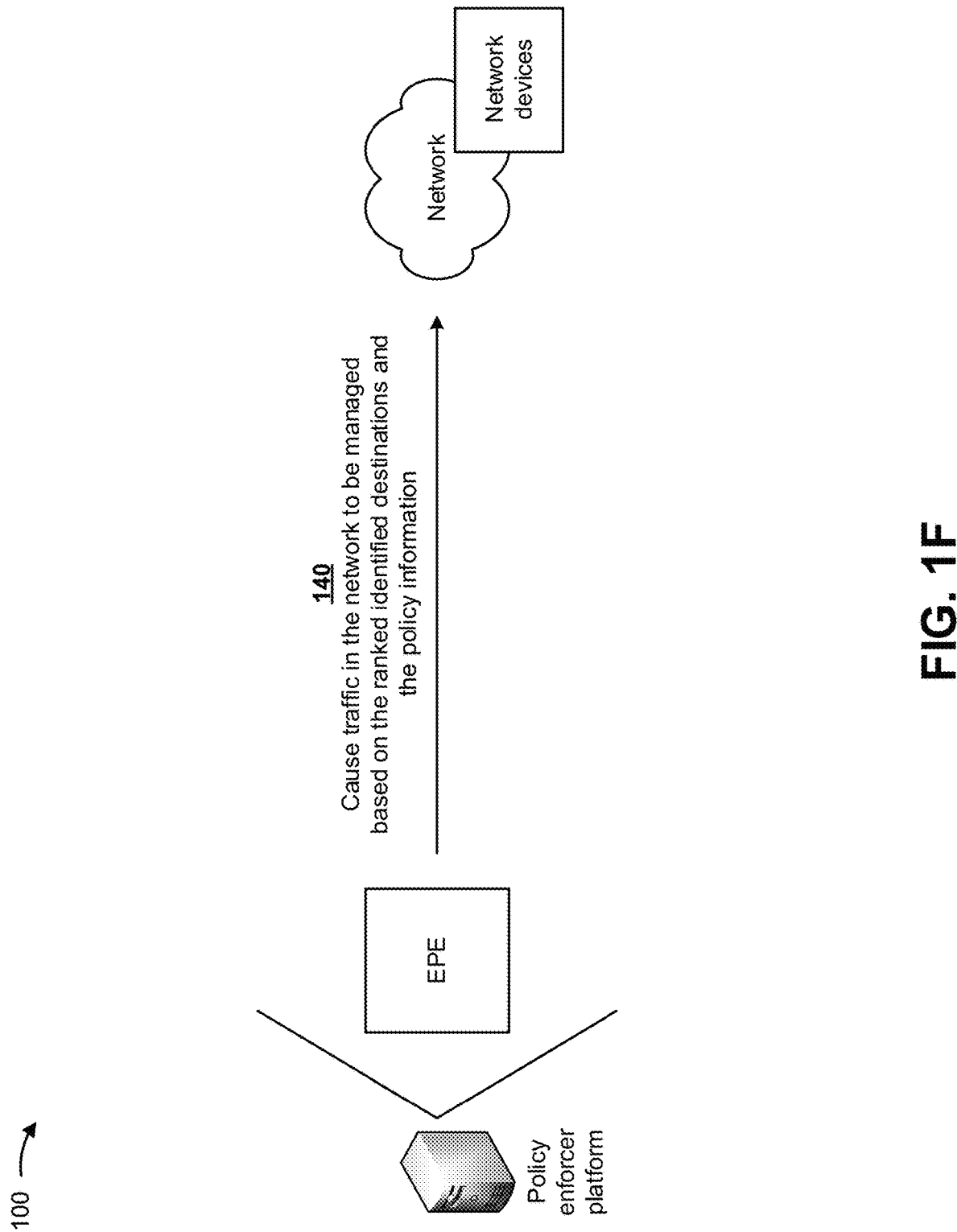

As shown in FIG. 1F, and by reference number 140, the policy enforcer platform may cause traffic in the network to be managed based on the ranked identified destinations and based on the policy information. In some implementations, the policy enforcer platform may provide, to a control device associated with the network, information indicating that the traffic in the network is to be managed based on the ranked identified destinations and based on the policy information. In such implementations, the control device may provide, to the ranked identified destinations, instructions to manage the traffic in the network based on the policy information. The ranked identified destinations may receive the instructions, and may manage the traffic in the network based on the policy information and based on the instructions. In some implementations, the ranked identified destinations may direct traffic towards a specific egress network device and a specific external interface to reach a particular destination out of the network, may select a best advertised egress route and mapping of the selected best route to a specific egress point, and/or the like, in accordance with egress peer engineering techniques.

Figure 1G:
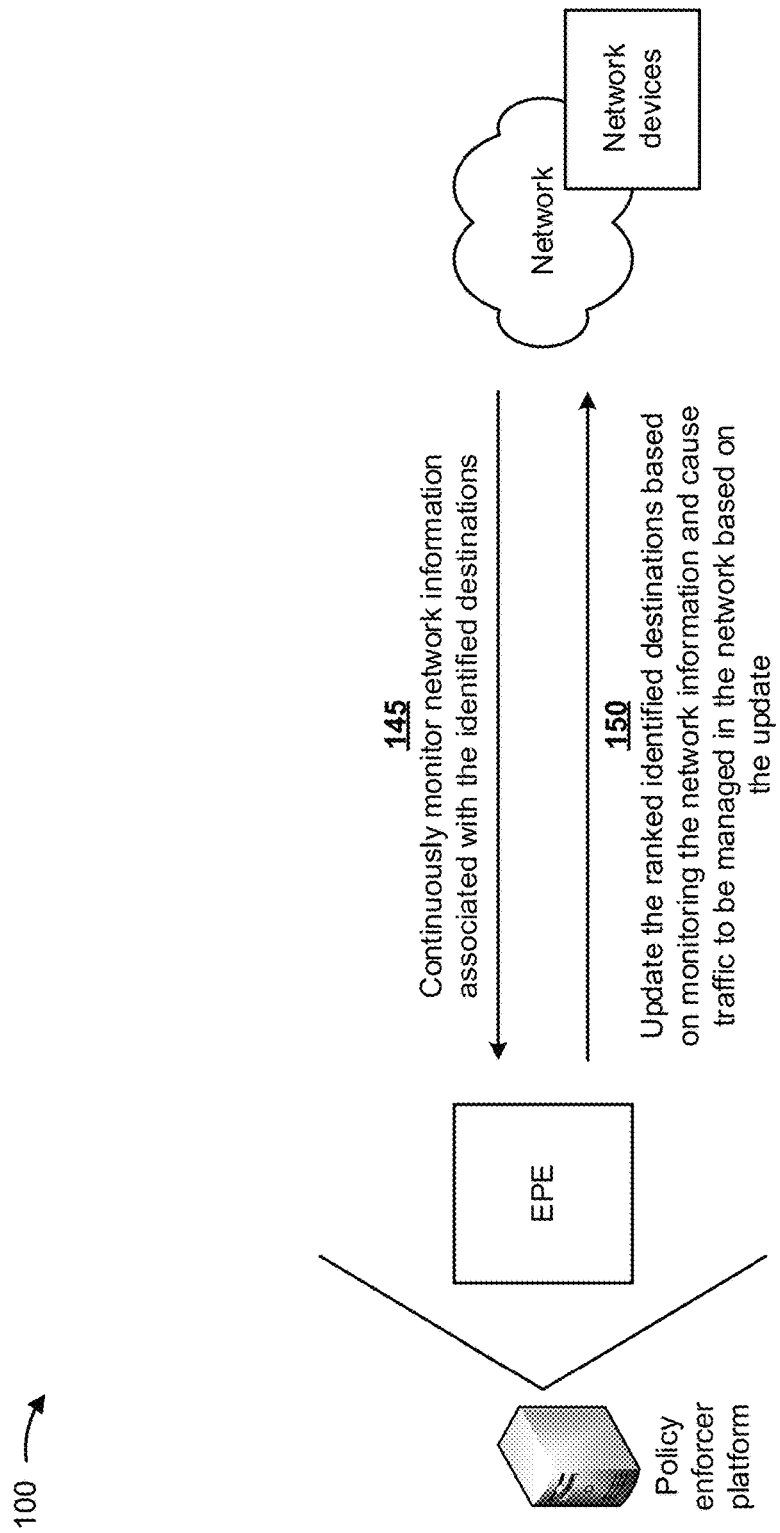

As shown in FIG. 1G, and by reference number 145, the policy enforcer platform may continuously monitor network information associated with the identified destinations. In some implementations, since network conditions may continuously change, the policy enforcer platform may continuously monitor the network information associated with the identified destinations in order to continuously optimize the network.

As further shown in FIG. 1G, and by reference number 150, the policy enforcer platform may update the ranked identified destinations based on monitoring the network information associated with the ranked identified destinations. In some implementations, the policy enforcer may change rankings associated with the identified destinations, may remove one or more destinations from the ranked identified destinations, may add one or more destinations to the ranked identified destinations, and/or the like, based on monitoring the network information associated with the ranked identified destinations. As further shown by reference number 150, the policy enforcer platform may cause traffic to be managed in the network based on the update. In some implementations, the policy enforcer platform may cause the update to be implemented by the network in a similar manner as described above in connection with FIG. 1F.

Figure 1H:
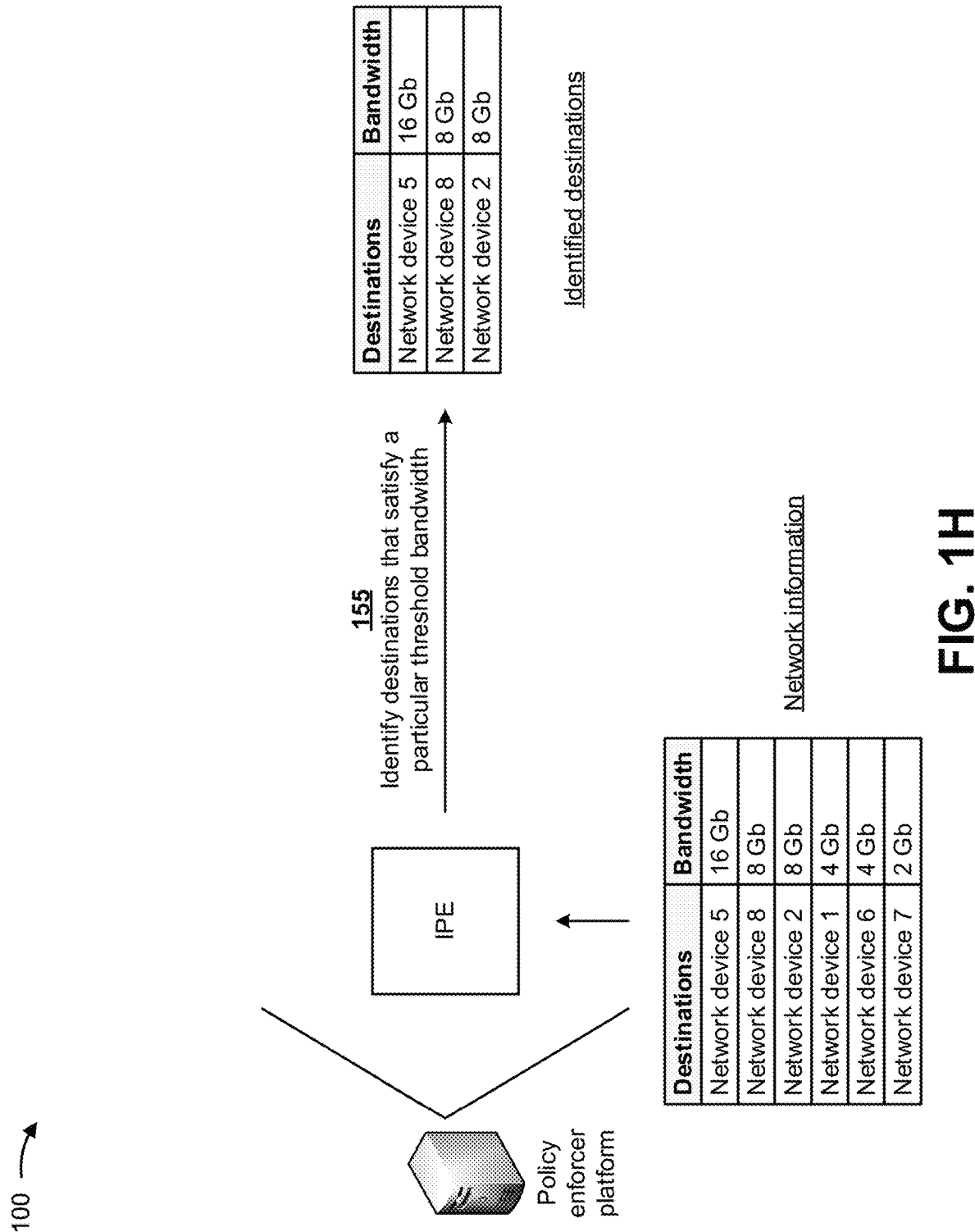

As shown in FIG. 1H, if the policy enforcer platform determines that the policy information is associated with ingress peer engineering, the policy enforcer platform may implement ingress peer engineering techniques with the network information. In some implementations, the ingress peer engineering techniques may enable a network to match destinations, announced by the network, with an internal core capacity in order to deliver traffic to the destinations while minimizing, controlling, and optimizing the internal core capacity. In some implementations, the network information may include information identifying destinations of the network (e.g., network device 5, network device 8, network device 2, network device 1, network device 6, network device 7, and/or the like), bandwidth utilization by the destinations (e.g., sixteen Gb, eight Gb, eight Gb, four Gb, four Gb, two Gb, and/or the like), and/or the like.

As further shown in FIG. 1H, and by reference number 155, the policy enforcer platform may identify destinations of the network that satisfy the particular bandwidth threshold, described above in connection with FIG. 1C. For example, as further shown in FIG. 1H, based on the particular bandwidth threshold, the policy enforcer platform may identify network device 5, network device 8, and network device 2, as the identified destinations of the network.

Figure 1I:
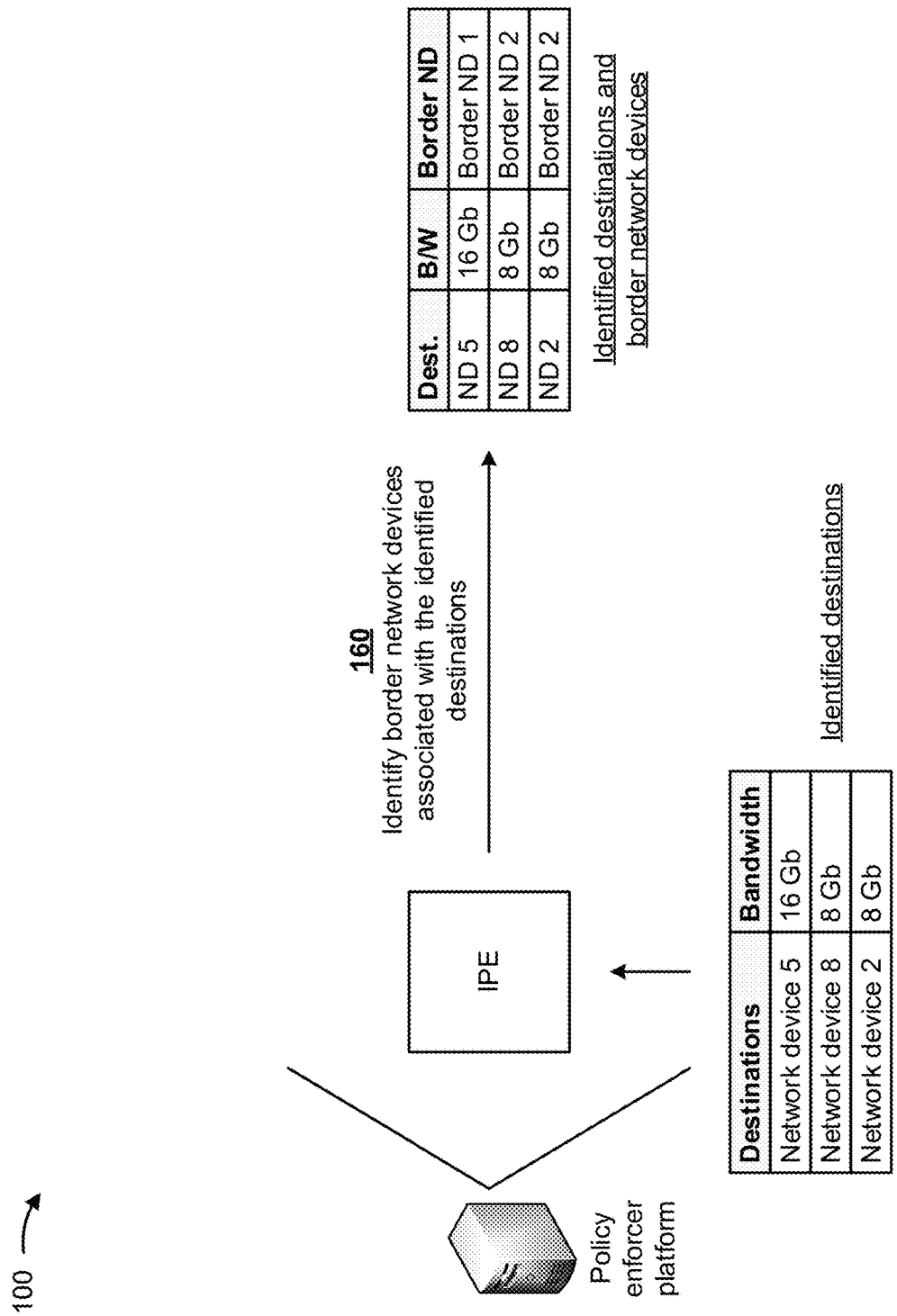

As shown in FIG. 1I, the policy enforcer platform may utilize the ingress peer engineering techniques with the identified destinations. As further shown in FIG. 1I, and by reference number 160, the policy enforcer platform may identify border network devices (e.g., edge routers) associated with the identified destinations. In some implementations, the policy enforcer platform may utilize the network information to identify border network devices of the network, and to determine which of the border network devices are associated with the identified destinations (e.g., connect to the identified destinations, are associated with a path to the identified destinations, and/or the like). For example, as shown in FIG. 1I, the policy enforcer platform may determine that border network device 1 is associated with network device 5 and that border network device 2 is associated with network device 8 and network device 2.

Figure 1J:
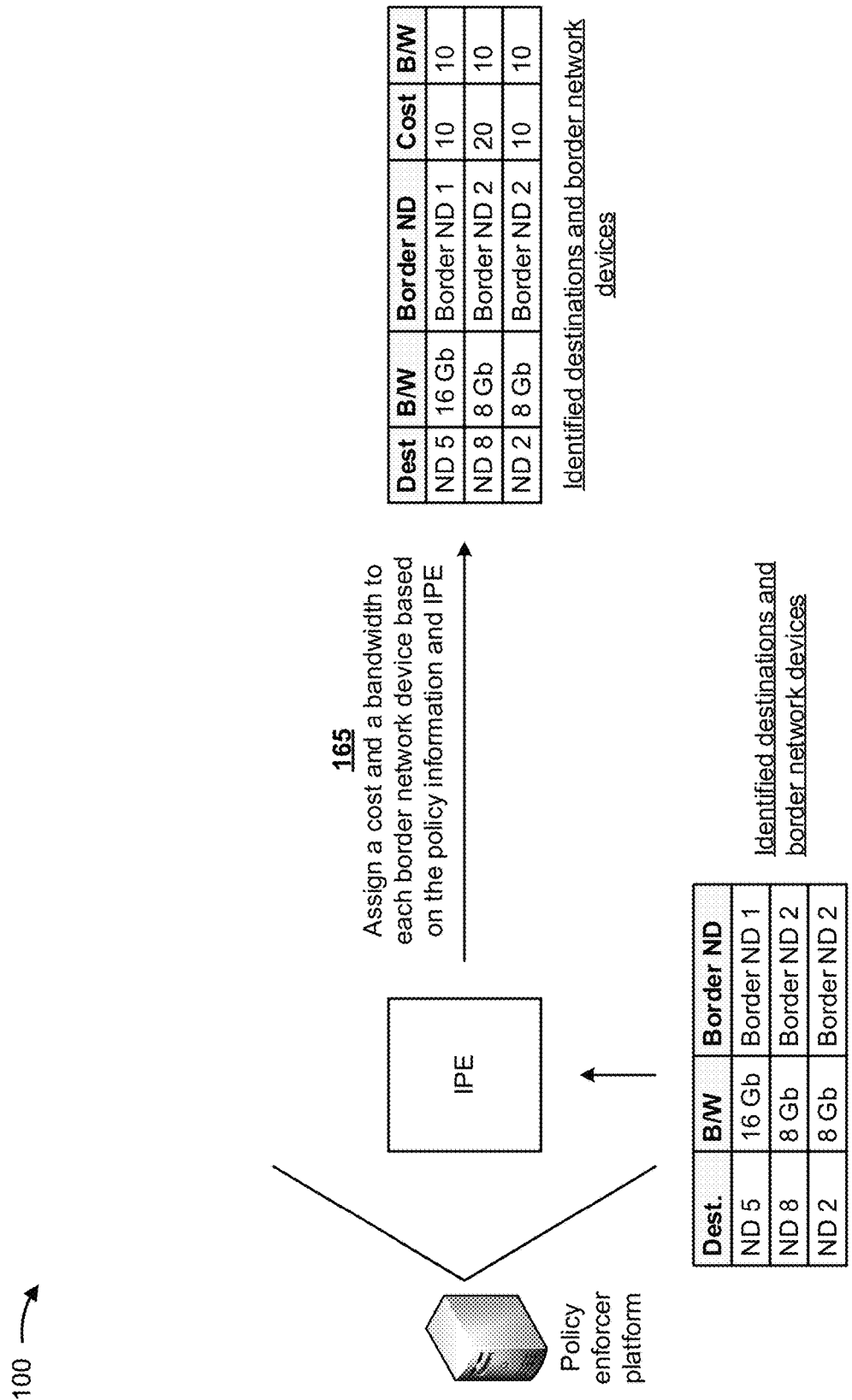

As shown in FIG. 1J, the policy enforcer platform may utilize the ingress peer engineering techniques with the identified destinations and the associated border network devices. As further shown in FIG. 1J, and by reference number 165, the policy enforcer platform may assign a cost and a bandwidth to the border network devices based on the policy information and the ingress peer engineering techniques. In some implementations, the costs and the bandwidths assigned to the border network devices may be determined based on the policy information. In some implementations, the policy enforcer platform may utilize machine learning models (e.g., supervised learning models, unsupervised learning models, reinforcement learning models, and/or the like) to monitor past behavior in the network and, from the past behavior, may determine how to best assign costs and bandwidths to the identified destinations.

For example, if the policy information indicates a desire to reduce network costs, the costs assigned to the border network devices may be defined to reduce network costs. In another example, if the policy information indicates a desire to conserve network resources, the bandwidths assigned to the border network devices may be defined to conserve network resources. As further shown in FIG. 1J, the policy enforcer platform may assign a cost of ten (e.g., dollars) to network device 5 and network device 2, may assign a cost of twenty to network device 8, and may assign a bandwidth of ten Gb to network device 5, network device 8, and network device 2.

Figure 1K:
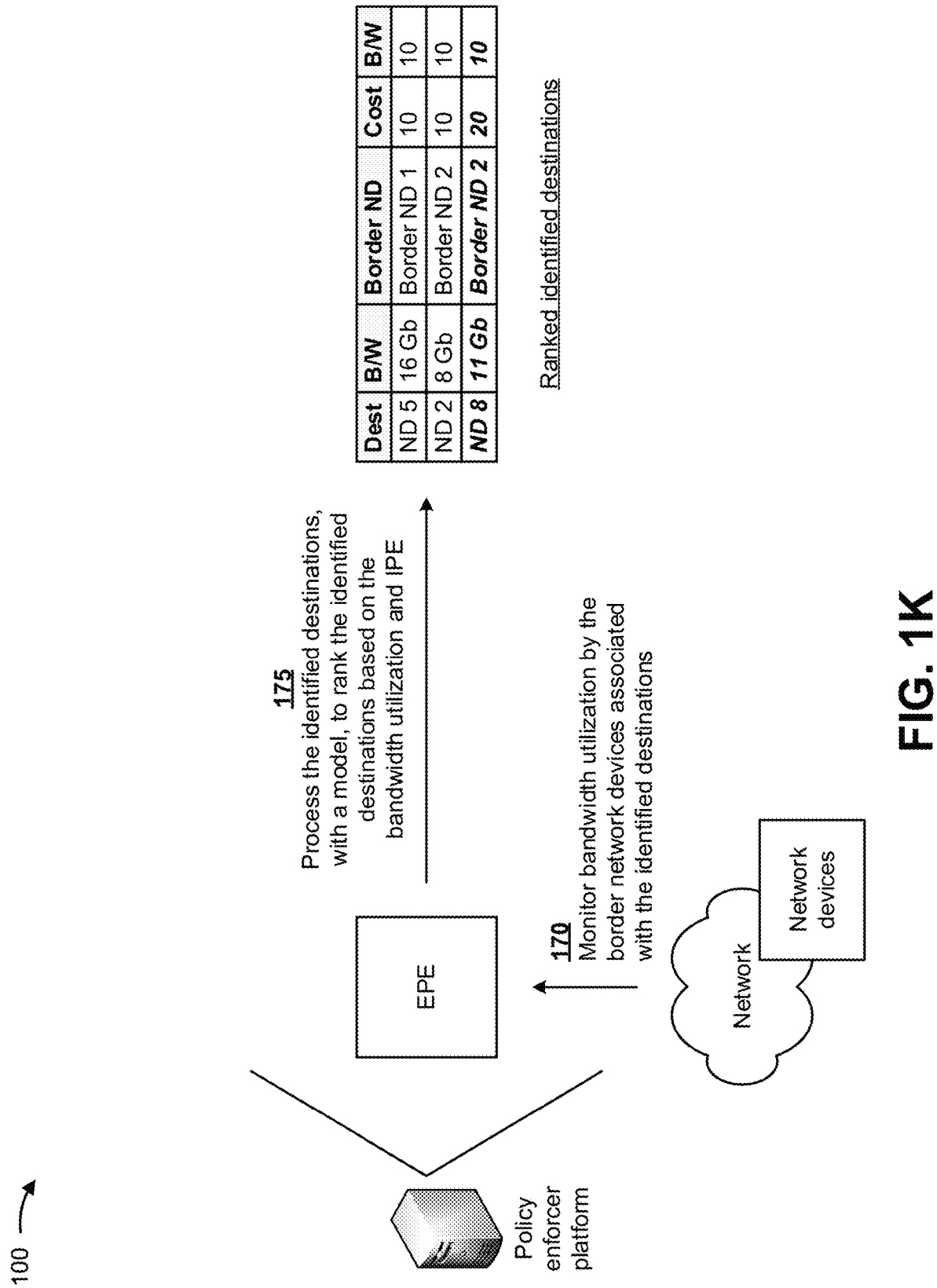

As shown in FIG. 1K, and by reference number 170, the policy enforcer platform may monitor bandwidth utilization by the border network devices. For example, based on monitoring the bandwidth utilized by the border network devices, the policy enforcer platform may determine that network device 5 utilizes sixteen Gb of bandwidth, network device 8 utilizes eleven Gb of bandwidth (but previously utilized only eight Gb of bandwidth, as shown in FIG. 1J), and network device 2 utilizes eight Gb of bandwidth.

As further shown in FIG. 1K, and by reference number 175, the policy enforcer platform may process information associated with the identified destinations, with a model, to rank the identified destinations based on the bandwidth utilization and the ingress peer engineering techniques. As shown in FIG. 1K, the policy enforcer platform may rank the identified destinations to generate ranked identified destinations. For example, since the bandwidth utilization of network device 8 is eleven Gb (e.g., which is greater than the assigned bandwidth of ten Gb), the policy enforcer platform may rank network device 8 at a lowest position of the ranked identified destinations.

In some implementations, the model may include a least-fill model, a load-balancing model, a most-fill model, and/or the like, as described above in connection with FIG. 1E. In some implementations, the policy enforcer platform may utilize one or more of the least-fill model, the load-balancing model, and/or the most-fill model, and may utilize best results determined by one of the least-fill model, the load-balancing model, and/or the most-fill model. In some implementations, the policy enforcer platform may utilize a plurality of the least-fill model, the load-balancing model, and the most-fill model, and may aggregate the results determined by the plurality of models.

In some implementations, the policy enforcer platform may utilize one or more of the least-fill model, the load-balancing model, and/or the most-fill model, and may utilize best results determined by one of the least-fill model, the load-balancing model, and/or the most-fill model. In some implementations, the policy enforcer platform may utilize a plurality of the least-fill model, the load-balancing model, and the most-fill model, and may aggregate the results determined by the plurality of models. In some implementations, the policy enforcer platform may utilize the one or more of the least-fill model, the load-balancing model, and/or the most-fill model and the rankings of the identified destinations, to determine paths through the network that satisfy the one or more of the least-fill model, the load-balancing model, and/or the most-fill model and the policy information.

Figure 1L:
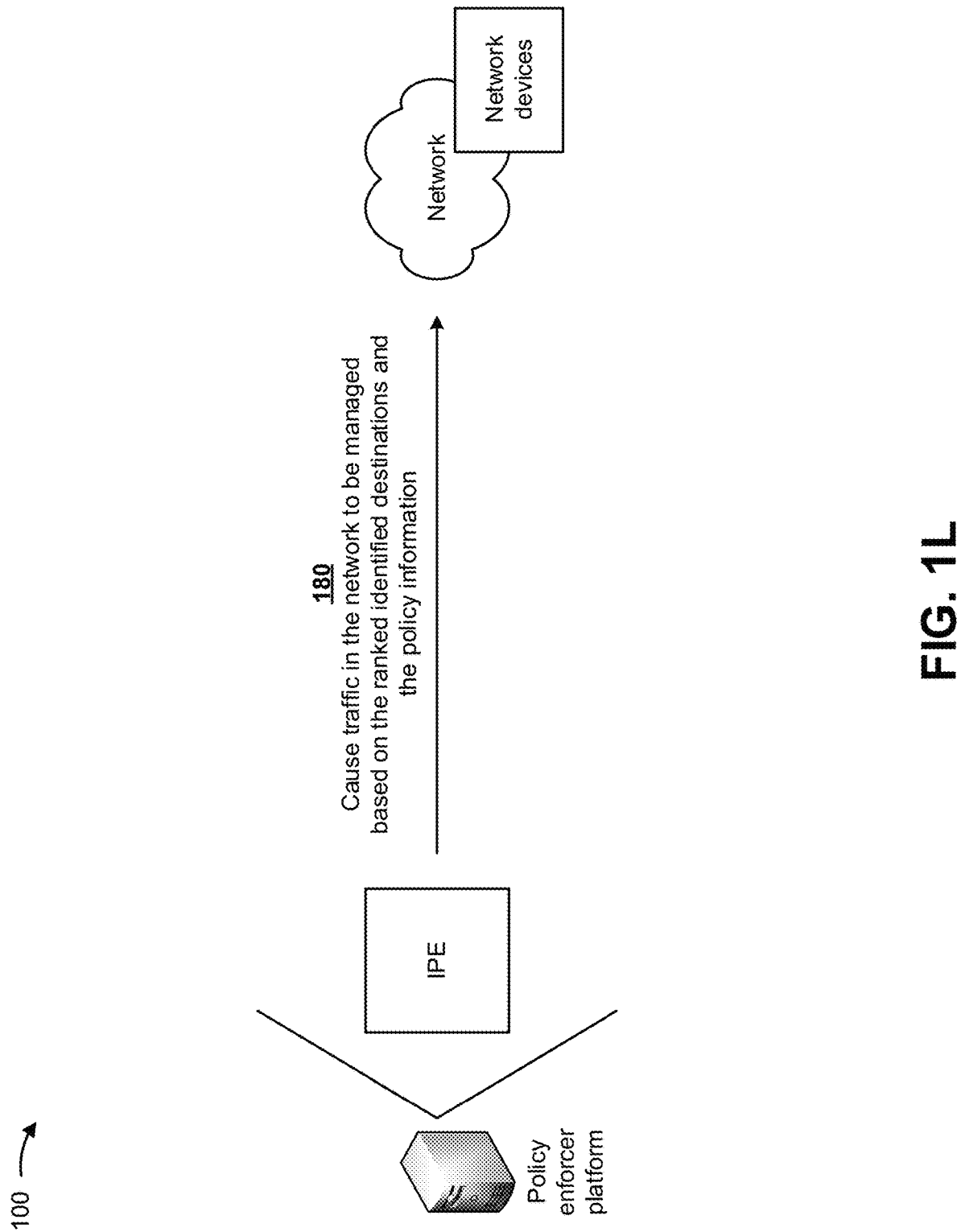

As shown in FIG. 1L, and by reference number 180, the policy enforcer platform may cause traffic in the network to be managed based on the ranked identified destinations and based on the policy information. In some implementations, the policy enforcer platform may provide, to a control device associated with the network, information indicating that the traffic in the network is to be managed based on the ranked identified destinations and based on the policy information. In such implementations, the control device may provide, to the ranked identified destinations, instructions to manage the traffic in the network based on the policy information. The ranked identified destinations may receive the instructions, and may manage the traffic in the network based on the policy information and based on the instructions. In some implementations, the network may match destinations, announced by the network, with an internal core capacity in order to deliver traffic to the identified destinations while minimizing, controlling, and optimizing the internal core capacity, in accordance with ingress peer engineering techniques.

Figure 1M:
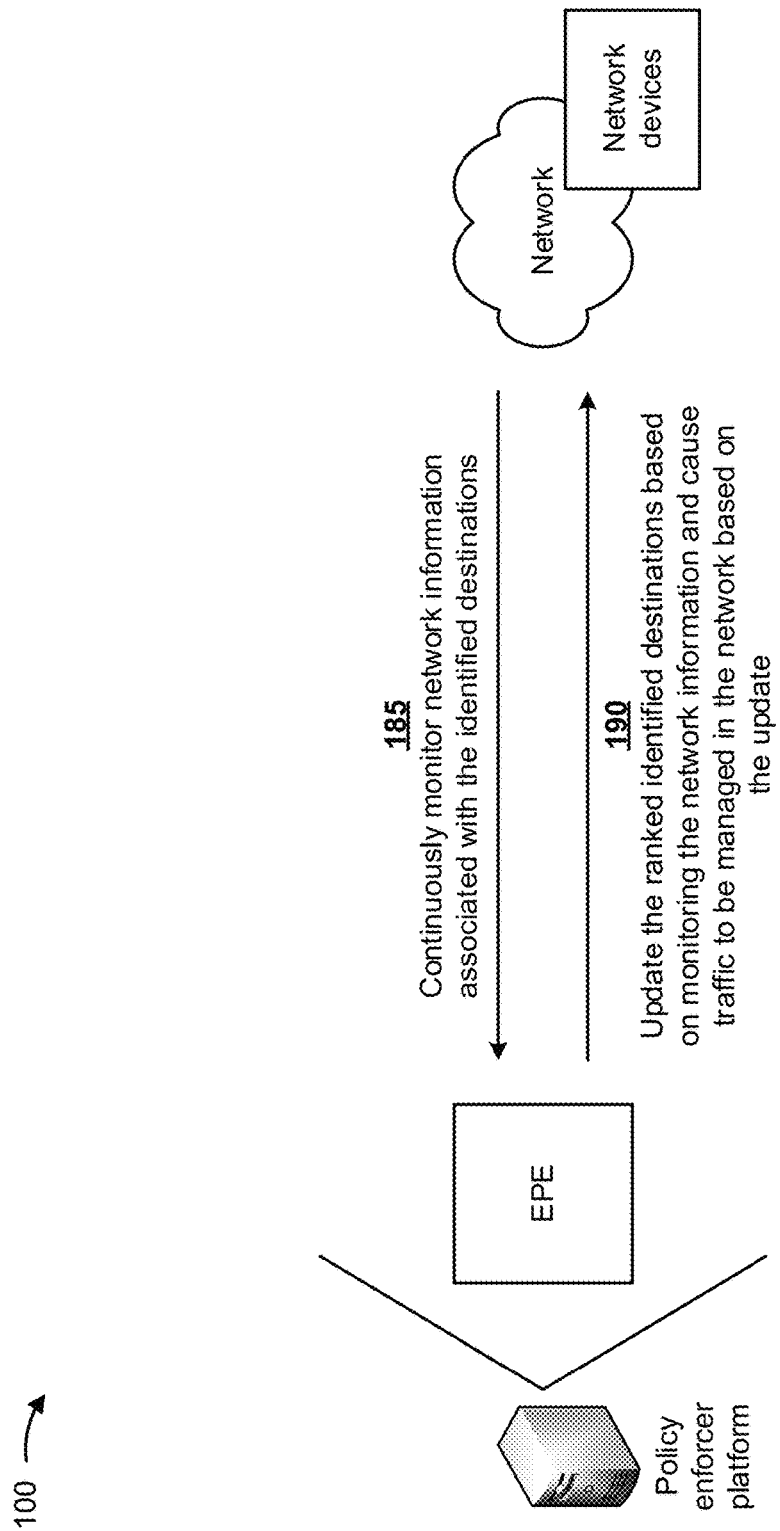

As shown in FIG. 1M, and by reference number 185, the policy enforcer platform may continuously monitor network information associated with the identified destinations. In some implementations, since network conditions may continuously change, the policy enforcer platform may continuously monitor the network information associated with the identified destinations in order to continuously optimize the network.

As further shown in FIG. 1M, and by reference number 190, the policy enforcer platform may update the ranked identified destinations based on monitoring the network information associated with the ranked identified destinations. In some implementations, the policy enforcer may change rankings associated with the identified destinations, may remove one or more destinations from the ranked identified destinations, may add one or more destinations to the ranked identified destinations, and/or the like, based on monitoring the network information associated with the ranked identified destinations. As further shown by reference number 190, the policy enforcer platform may cause traffic to be managed in the network based on the update. In some implementations, the policy enforcer platform may cause the update to be implemented by the network in a similar manner as described above in connection with FIG. 1L.

In some implementations, the policy enforcer platform may dynamically identify (e.g., from a network policy, such as reducing cost, conserving resources, reduce underutilization, and/or the like) network destinations that represent a majority of traffic in the network. In some implementations, the policy enforcer platform may validate the identified network destinations based on a protocol routing table of target and/or programmable network devices. In some implementations, the policy enforcer platform may associate a bandwidth attribute and/or a cost attribute with each of the identified network destinations. In some implementations, the policy enforcer platform may dynamically associate the identified network destinations with a border network device (e.g., an autonomous system border router (ASBR)) for announcement and/or an egress interface of the border network device (e.g., in order to implement traffic forwarding rules in the network). In some implementations, the policy enforcer platform may program the network (e.g., implement the traffic forwarding rules) via a NETCONF, a BGP, a segment routing protocol, a PCEP, and/or the like.

In this way, several different stages of the process for determining and implementing egress peer engineering and/or ingress peer engineering for destinations in a network may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to automatically determine and implement egress peer engineering and/or ingress peer engineering for destinations in a network based on a policy. Finally, automating the process for determining and implementing egress peer engineering and/or ingress peer engineering for destinations in a network conserves computing resources (e.g., processor resources, memory resources, and/or the like) that would otherwise be wasted in attempting to determine and implement egress peer engineering and/or ingress peer engineering for destinations in a network.

As indicated above, FIGS. 1A-1M are provided merely as examples. Other examples are possible and may differ from what was described with regard to FIGS. 1A-1M.

Figure 2:
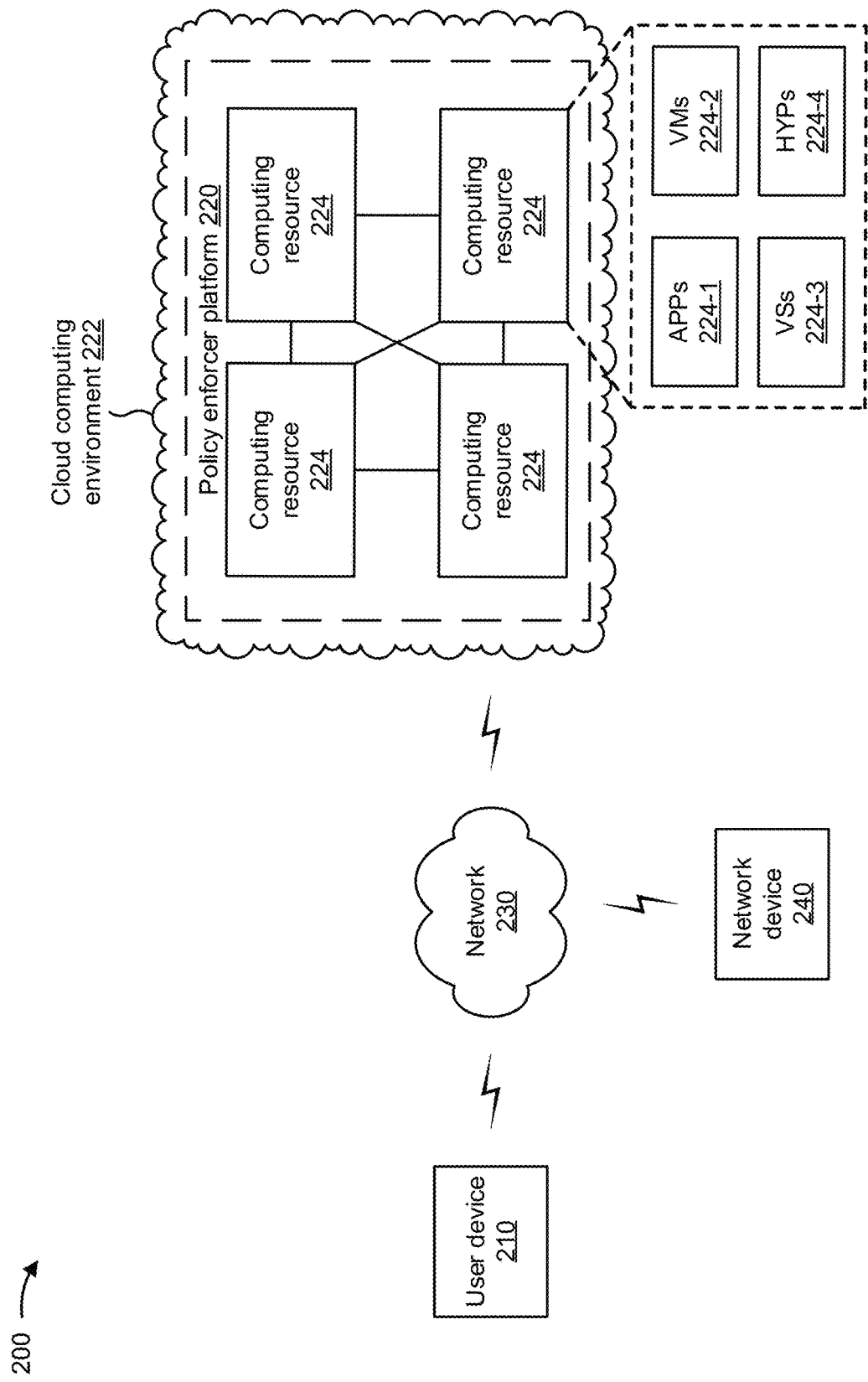
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a policy enforcer platform 220, a network 230, and a network device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to one or more other devices of environment 200.

Policy enforcer platform 220 includes one or more devices capable of determining and implementing egress peer engineering and/or ingress peer engineering for destinations in a network. In some implementations, policy enforcer platform 220 may be designed to be modular such that certain software components may be swapped in or out depending on a particular need. As such, policy enforcer platform 220 may be easily and/or quickly reconfigured for different uses. In some implementations, policy enforcer platform 220 may receive information from and/or transmit information to one or more other devices of environment 200.

In some implementations, as shown, policy enforcer platform 220 may be hosted in a cloud computing environment 222. Notably, while implementations described herein describe policy enforcer platform 220 as being hosted in cloud computing environment 222, in some implementations, policy enforcer platform 220 may not be cloud-based (i.e., may be implemented outside of a cloud computing environment, such as within one or more server devices) or may be partially cloud-based.

Cloud computing environment 222 includes an environment that hosts policy enforcer platform 220. Cloud computing environment 222 may provide computation, software, data access, storage, etc. services that do not require end-user knowledge of a physical location and configuration of system(s) and/or device(s) that hosts policy enforcer platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host policy enforcer platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with policy enforcer platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of policy enforcer platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices (e.g., one or more traffic transfer devices) capable of receiving, providing, storing, generating, and/or processing information described herein. For example, network device 240 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 240 may receive information from and/or provide information to one or more other devices of environment 200. In some implementations, network device 240 may be a physical device implemented within a housing, such as a chassis. In some implementations, network device 240 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
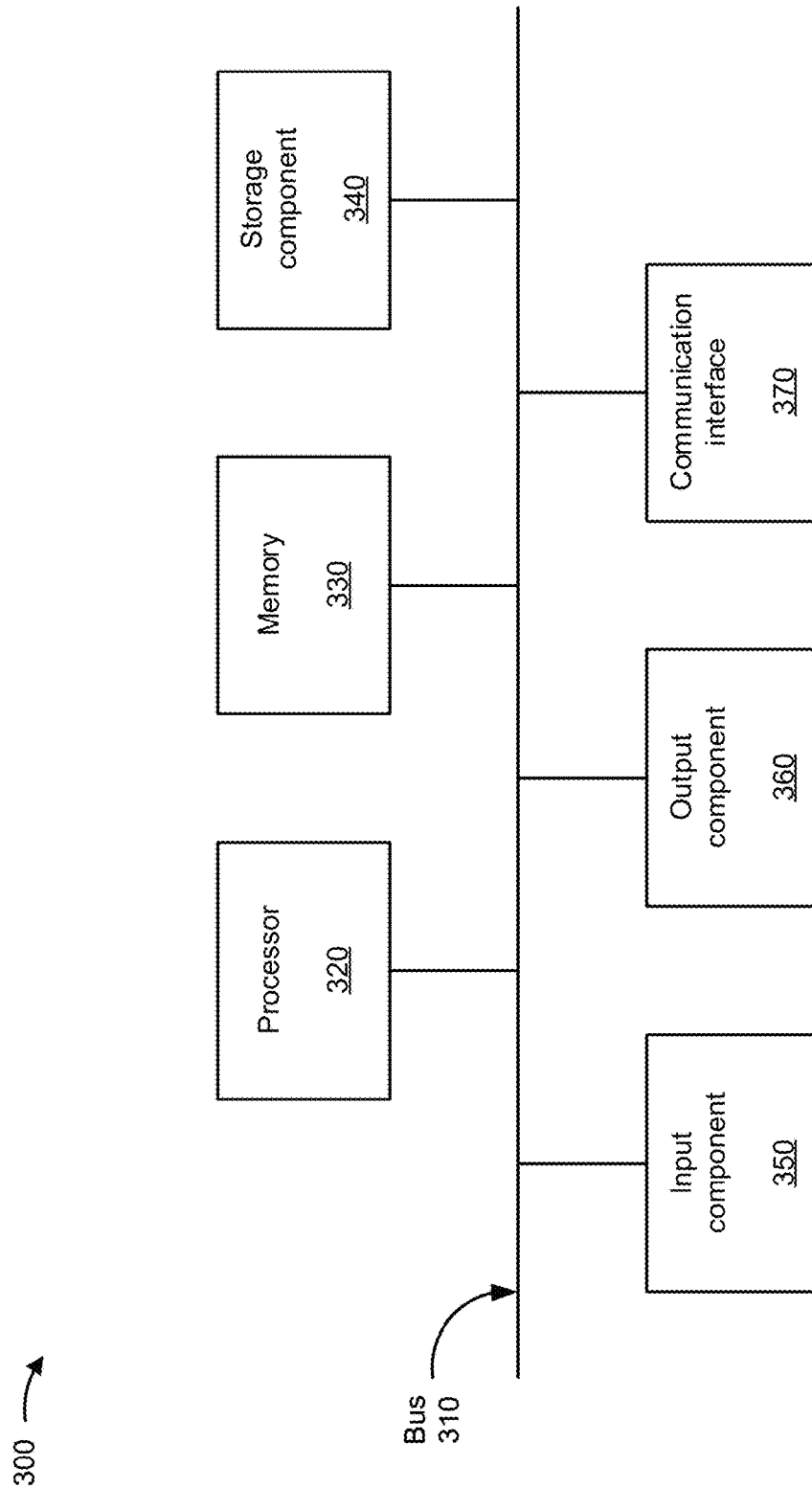
FIG. 3 is a diagram of example components of one or more devices of FIG. 2.

FIG. 3 is a diagram of example components of a device 300. Device 300 may correspond to user device 210, policy enforcer platform 220, computing resource 224, and/or network device 240. In some implementations, user device 210, policy enforcer platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
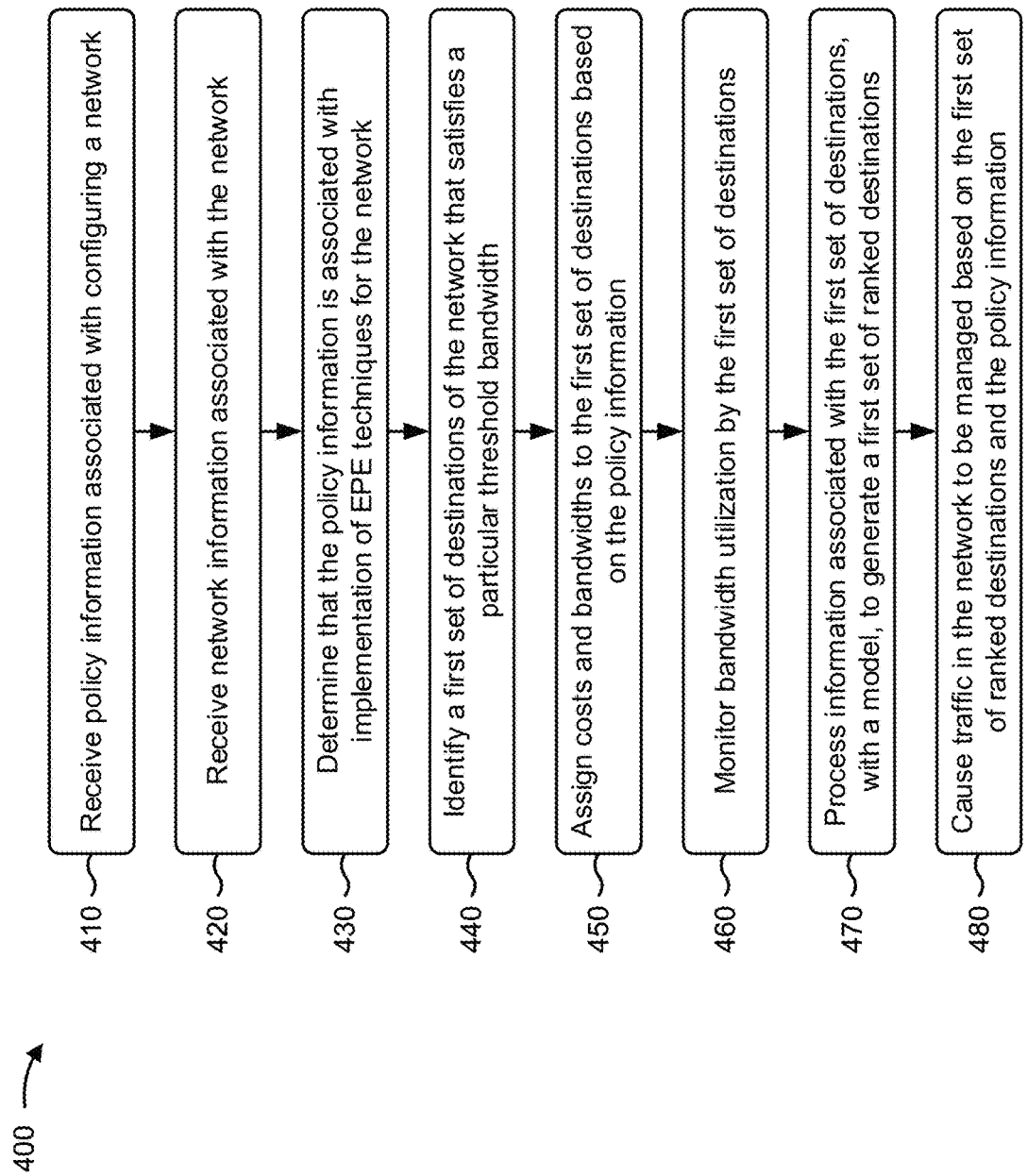
FIG. 4 is a flow chart of an example process for determining and implementing egress peer engineering and/or ingress peer engineering for destinations in a network.

FIG. 4 is a flow chart of an example process 400 for determining and implementing egress peer engineering and/or ingress peer engineering for destinations in a network. In some implementations, one or more process blocks of FIG. 4 may be performed by a policy enforcer platform (e.g., policy enforcer platform 220). In some implementations, one or more process blocks of FIG. 4 may be performed by another device or a group of devices separate from or including policy enforcer platform 220, such as user device 210 and/or network device 240.

As shown in FIG. 4, process 400 may include receiving policy information associated with configuring a network (block 410). For example, the policy enforcer platform (e.g., using computing resource 224, processor 320, communication interface 370, and/or the like) may receive policy information associated with configuring a network, as described above in connection with FIGS. 1A-2.

As further shown in FIG. 4, process 400 may include receiving network information associated with the network (block 420). For example, the policy enforcer platform (e.g., using computing resource 224, processor 320, communication interface 370, and/or the like) may receive network information associated with the network, as described above in connection with FIGS. 1A-2.

As further shown in FIG. 4, process 400 may include determining, based on the network information, that the policy information is associated with implementation of egress peer engineering techniques for the network (block 430). For example, the policy enforcer platform (e.g., using computing resource 224, processor 320, storage component 340, and/or the like) may determine, based on the network information, that the policy information is associated with implementation of egress peer engineering techniques for the network, as described above in connection with FIGS. 1A-2.

As further shown in FIG. 4, process 400 may include identifying, based on the network information, a first set of destinations of the network that satisfies a particular threshold bandwidth (block 440). For example, the policy enforcer platform (e.g., using computing resource 224, processor 320, memory 330, and/or the like) may identify, based on the network information, a first set of destinations of the network that satisfies a particular threshold bandwidth, as described above in connection with FIGS. 1A-2.

As further shown in FIG. 4, process 400 may include assigning costs and bandwidths to the first set of destinations based on the policy information (block 450). For example, the policy enforcer platform (e.g., using computing resource 224, processor 320, storage component 340, and/or the like) may assign costs and bandwidths to the first set of destinations based on the policy information, as described above in connection with FIGS. 1A-2.

As further shown in FIG. 4, process 400 may include monitoring bandwidth utilization by the first set of destinations (block 460). For example, the policy enforcer platform (e.g., using computing resource 224, processor 320, memory 330, and/or the like) may monitor bandwidth utilization by the first set of destinations, as described above in connection with FIGS. 1A-2.

As further shown in FIG. 4, process 400 may include processing information associated with the first set of destinations, with a model, based on the bandwidth utilization and based on the egress peer engineering techniques, to generate a first set of ranked destinations (block 470). For example, the policy enforcer platform (e.g., using computing resource 224, processor 320, storage component 340, and/or the like) may process information associated with the first set of destinations, with a model, based on the bandwidth utilization and based on the egress peer engineering techniques, to generate a first set of ranked destinations, as described above in connection with FIGS. 1A-2.

As further shown in FIG. 4, process 400 may include causing traffic in the network to be managed based on the first set of ranked destinations and the policy information (block 480). For example, the policy enforcer platform (e.g., using computing resource 224, processor 320, communication interface 370, and/or the like) may cause traffic in the network to be managed based on the first set of ranked destinations and the policy information, as described above in connection with FIGS. 1A-2.

Process 400 may include additional implementations, such as any single implementation or any combination of implementations described below and/or in connection with one or more other processes described elsewhere herein.

In some implementations, the policy enforcer platform may monitor the network information associated with the first set of destinations, may update the first set of ranked destinations based on monitoring the network information associated with the first set of destinations, and may cause the traffic in the network to be managed based on updating the first set of ranked destinations.

In some implementations, the policy enforcer platform may determine, based on the network information, that the policy information is associated with implementation of ingress peer engineering techniques for the network, may identify, based on the network information, a second set of destinations of the network that satisfies the particular threshold bandwidth, may identify border network devices, of the network, associated with the second set of destinations, and may assign costs and bandwidths to the border network devices based on the policy information. Additionally, the policy enforcer platform may monitor bandwidth utilization by the border network devices, may process information associated with the second set of destinations, with the model, based on the bandwidth utilization by the border network devices and based on the ingress peer engineering techniques, to generate a second set of ranked destinations, and may cause traffic in the network to be managed based on the second set of ranked destinations and the policy information.

In some implementations, the policy enforcer platform may monitor the network information associated with the second set of destinations, may update the second set of ranked destinations based on monitoring the network information associated with the second set of destinations, and may cause the traffic in the network to be managed based on updating the second set of ranked destinations.

In some implementations, when causing the traffic in the network to be managed, the policy enforcer platform may cause the traffic in the network to be managed based on a network configuration protocol (NETCONF), may cause the traffic in the network to be managed based on a border gateway protocol (BGP), may cause the traffic in the network to be managed based on a segment routing protocol, or may cause the traffic in the network to be managed based on a path computation element communication protocol (PCEP).

In some implementations, the policy information may include information associated with reducing a cost associated with the network, conserving resources associated with the network, or reducing underutilization of the resources associated with the network. In some implementations, when causing the traffic in the network to be managed, the policy enforcer platform may provide, to the network, forwarding rules based on the first set of ranked destinations, the policy information, and the egress peer engineering techniques.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for determining and implementing egress peer engineering and/or ingress peer engineering for destinations in a network. In some implementations, one or more process blocks of FIG. 5 may be performed by a policy enforcer platform (e.g., policy enforcer platform 220). In some implementations, one or more process blocks of FIG. 5 may be performed by another device or a group of devices separate from or including policy enforcer platform 220, such as user device 210 and/or network device 240.

As shown in FIG. 5, process 500 may include receiving policy information associated with configuring a network (block 510). For example, the policy enforcer platform (e.g., using computing resource 224, processor 320, communication interface 370, and/or the like) may receive policy information associated with configuring a network, as described above in connection with FIGS. 1A-2.

As further shown in FIG. 5, process 500 may include receiving network information associated with the network (block 520). For example, the policy enforcer platform (e.g., using computing resource 224, processor 320, communication interface 370, and/or the like) may receive network information associated with the network, as described above in connection with FIGS. 1A-2.

As further shown in FIG. 5, process 500 may include determining, based on the network information, that the policy information is associated with implementation of egress peer engineering techniques or ingress peer engineering techniques for the network (block 530). For example, the policy enforcer platform (e.g., using computing resource 224, processor 320, memory 330, and/or the like) may determine, based on the network information, that the policy information is associated with implementation of egress peer engineering techniques or ingress peer engineering techniques for the network, as described above in connection with FIGS. 1A-2.

As further shown in FIG. 5, process 500 may include performing, when the policy information is associated with implementation of the egress peer engineering techniques, a first set of actions that causes traffic in the network to be managed based on a first set of ranked destinations of the network, the egress peer engineering techniques, and the policy information (block 540). For example, the policy enforcer platform (e.g., using computing resource 224, processor 320, storage component 340, communication interface 370, and/or the like) may perform, when the policy information is associated with implementation of the egress peer engineering techniques, a first set of actions that causes traffic in the network to be managed based on a first set of ranked destinations of the network, the egress peer engineering techniques, and the policy information, as described above in connection with FIGS. 1A-2.

As further shown in FIG. 5, process 500 may include performing, when the policy information is associated with implementation of the ingress peer engineering techniques, a second set of actions that causes the traffic in the network to be managed based on a second set of ranked destinations of the network, the ingress peer engineering techniques, and the policy information (block 550). For example, the policy enforcer platform (e.g., using computing resource 224, processor 320, memory 330, communication interface 370, and/or the like) may perform, when the policy information is associated with implementation of the ingress peer engineering techniques, a second set of actions that causes the traffic in the network to be managed based on a second set of ranked destinations of the network, the ingress peer engineering techniques, and the policy information, as described above in connection with FIGS. 1A-2.

Process 500 may include additional implementations, such as any single implementation or any combination of implementations described below and/or in connection with one or more other processes described elsewhere herein.

In some implementations, when performing the first set of actions, the policy enforcer platform may identify, based on the network information, a first set of destinations of the network that satisfies a particular threshold bandwidth, may assign costs and bandwidths to the first set of destinations based on the policy information, may monitor bandwidth utilization by the first set of destinations, and may process information associated with the first set of destinations, with a model, based on the bandwidth utilization and based on the egress peer engineering techniques, to generate the first set of ranked destinations.

In some implementations, when performing the first set of actions, the policy enforcer platform may monitor the network information associated with the first set of destinations, may update the first set of ranked destinations based on monitoring the network information associated with the first set of destinations, and may cause the traffic in the network to be managed based on updating the first set of ranked destinations.

In some implementations, when performing the second set of actions, the policy enforcer platform may identify, based on the network information, a second set of destinations of the network that satisfies the particular threshold bandwidth, may identify border network devices, of the network, associated with the second set of destinations, may assign costs and bandwidths to the border network devices based on the policy information, may monitor bandwidth utilization by the border network devices, and may process information associated with the second set of destinations, with the model, based on the bandwidth utilization by the border network devices and based on the ingress peer engineering techniques, to generate the second set of ranked destinations.

In some implementations, when performing the second set of actions, the policy enforcer platform may monitor the network information associated with the second set of destinations, may update the second set of ranked destinations based on monitoring the network information associated with the second set of destinations, and may cause the traffic in the network to be managed based on updating the second set of ranked destinations.

In some implementations, the traffic in the network may be managed based on a network configuration protocol (NETCONF), a border gateway protocol (BGP), a segment routing protocol, or a path computation element communication protocol (PCEP). In some implementations, when performing the first set of actions, the policy enforcer platform may provide, to the network, a first set of forwarding rules based on the first set of ranked destinations, the policy information, and the egress peer engineering techniques, or, when performing the second set of actions, the policy enforcer platform may provide, to the network, a second set of forwarding rules based on the second set of ranked destinations, the policy information, and the ingress peer engineering techniques.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining and implementing egress peer engineering and/or ingress peer engineering for destinations in a network. In some implementations, one or more process blocks of FIG. 6 may be performed by a policy enforcer platform (e.g., policy enforcer platform 220). In some implementations, one or more process blocks of FIG. 6 may be performed by another device or a group of devices separate from or including policy enforcer platform 220, such as user device 210 and/or network device 240.

As shown in FIG. 6, process 600 may include receiving policy information associated with configuring a network (block 610). For example, the policy enforcer platform (e.g., using computing resource 224, processor 320, communication interface 370, and/or the like) may receive policy information associated with configuring a network, as described above in connection with FIGS. 1A-2.

As further shown in FIG. 6, process 600 may include receiving network information associated with the network (block 620). For example, the policy enforcer platform (e.g., using computing resource 224, processor 320, communication interface 370, and/or the like) may receive network information associated with the network, as described above in connection with FIGS. 1A-2.

As further shown in FIG. 6, process 600 may include determining, based on the network information, that the policy information is associated with implementation of ingress peer engineering techniques for the network (block 630). For example, the policy enforcer platform (e.g., using computing resource 224, processor 320, storage component 340, and/or the like) may determine, based on the network information, that the policy information is associated with implementation of ingress peer engineering techniques for the network, as described above in connection with FIGS. 1A-2.

As further shown in FIG. 6, process 600 may include identifying, based on the network information, a first set of destinations of the network that satisfies a particular threshold bandwidth (block 640). For example, the policy enforcer platform (e.g., using computing resource 224, processor 320, memory 330, and/or the like) may identify, based on the network information, a first set of destinations of the network that satisfies a particular threshold bandwidth, as described above in connection with FIGS. 1A-2.

As further shown in FIG. 6, process 600 may include identifying border network devices, of the network, associated with the first set of destinations (block 650). For example, the policy enforcer platform (e.g., using computing resource 224, processor 320, storage component 340, and/or the like) may identify border network devices, of the network, associated with the first set of destinations, as described above in connection with FIGS. 1A-2.

As further shown in FIG. 6, process 600 may include assigning costs and bandwidths to the border network devices based on the policy information (block 660). For example, the policy enforcer platform (e.g., using computing resource 224, processor 320, memory 330, and/or the like) may assign costs and bandwidths to the border network devices based on the policy information, as described above in connection with FIGS. 1A-2.

As further shown in FIG. 6, process 600 may include monitoring bandwidth utilization by the border network devices (block 670). For example, the policy enforcer platform (e.g., using computing resource 224, processor 320, storage component 340, and/or the like) may monitor bandwidth utilization by the border network devices, as described above in connection with FIGS. 1A-2.

As further shown in FIG. 6, process 600 may include processing information associated with the first set of destinations, with a model, based on the bandwidth utilization by the border network devices and based on the ingress peer engineering techniques, to generate a first set of ranked destinations (block 680). For example, the policy enforcer platform (e.g., using computing resource 224, processor 320, memory 330, and/or the like) may process information associated with the first set of destinations, with a model, based on the bandwidth utilization by the border network devices and based on the ingress peer engineering techniques, to generate a first set of ranked destinations, as described above in connection with FIGS. 1A-2.

As further shown in FIG. 6, process 600 may include causing traffic in the network to be managed based on the first set of ranked destinations and the policy information (block 690). For example, the policy enforcer platform (e.g., using computing resource 224, processor 320, communication interface 370, and/or the like) may cause traffic in the network to be managed based on the first set of ranked destinations and the policy information, as described above in connection with FIGS. 1A-2.

Process 600 may include additional implementations, such as any single implementation or any combination of implementations described below and/or in connection with one or more other processes described elsewhere herein.

In some implementations, the policy enforcer platform may monitor the network information associated with the first set of destinations, may update the first set of ranked destinations based on monitoring the network information associated with the first set of destinations, and may cause the traffic in the network to be managed based on updating the first set of ranked destinations.

In some implementations, the policy enforcer platform may determine, based on the network information, that the policy information is associated with implementation of egress peer engineering techniques for the network, may identify, based on the network information, a second set of destinations of the network that satisfies the particular threshold bandwidth, and may assign costs and bandwidths to the second set of destinations based on the policy information. Additionally, the policy enforcer platform may monitor bandwidth utilization by the second set of destinations, may process information associated with the second set of destinations, with the model, based on the bandwidth utilization by the second set of destinations, and based on the egress peer engineering techniques, to generate a second set of ranked destinations, and may cause traffic in the network to be managed based on the second set of ranked destinations and the policy information.

In some implementations, the policy enforcer platform may monitor the network information associated with the second set of destinations, may update the second set of ranked destinations based on monitoring the network information associated with the second set of destinations, and may cause the traffic in the network to be managed based on updating the second set of ranked destinations.

In some implementations, the traffic in the network may be managed based on a network configuration protocol (NETCONF), a border gateway protocol (BGP), a segment routing protocol, or a path computation element communication protocol (PCEP). In some implementations, when causing the traffic in the network to be managed, the policy enforcer platform may provide, to the network, forwarding rules based on the first set of ranked destinations, the policy information, and the ingress peer engineering techniques.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a policy enforcer platform that determines and implements egress peer engineering and/or ingress peer engineering for destinations in a network. For example, the policy enforcer platform may receive policy information associated with configuring a network, and may receive network information associated with the network. The policy enforcer platform may determine, based on the network information, that the policy information is associated with implementation of egress peer engineering techniques or ingress peer engineering techniques for the network. The policy enforcer platform may perform, when the policy information is associated with implementation of the egress peer engineering techniques, a first set of actions that causes traffic in the network to be managed based on a first set of ranked destinations of the network, the egress peer engineering techniques, and the policy information. The policy enforcer platform may perform, when the policy information is associated with implementation of the ingress peer engineering techniques, a second set of actions that causes the traffic in the network to be managed based on a second set of ranked destinations of the network, the ingress peer engineering techniques, and the policy information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
receive policy information associated with configuring a network;
receive network information associated with the network;
determine, based on the network information, that the policy information is associated with implementation of egress peer engineering techniques for the network;
identify, based on the network information, a first set of destinations of the network that satisfies a particular threshold bandwidth;
assign costs and bandwidths to the first set of destinations based on the policy information;

monitor bandwidth utilization by the first set of destinations;
process information associated with the first set of destinations, with a model, based on the bandwidth utilization and based on the egress peer engineering techniques, to generate a first set of ranked destinations; and
cause traffic in the network to be managed based on the first set of ranked destinations and the policy information,
wherein, when causing the traffic in the network to be managed, the one or more processors are to:
provide, to the network, forwarding rules based on the first set of ranked destinations, the policy information, and the egress peer engineering techniques.

2. The device of claim 1, wherein the one or more processors are further to:
monitor the network information associated with the first set of destinations;
update the first set of ranked destinations based on monitoring the network information associated with the first set of destinations; and
cause the traffic in the network to be managed based on updating the first set of ranked destinations.

3. The device of claim 1, wherein the one or more processors are further to:
determine, based on the network information, that the policy information is associated with implementation of ingress peer engineering techniques for the network;
identify, based on the network information, a second set of destinations of the network that satisfies the particular threshold bandwidth;
identify border network devices, of the network, associated with the second set of destinations;
assign costs and bandwidths to the border network devices based on the policy information;
monitor bandwidth utilization by the border network devices;
process information associated with the second set of destinations, with the model, based on the bandwidth utilization by the border network devices and based on the ingress peer engineering techniques, to generate a second set of ranked destinations; and
cause traffic in the network to be managed based on the second set of ranked destinations and the policy information.

4. The device of claim 3, wherein the one or more processors are further to:
monitor the network information associated with the second set of destinations;
update the second set of ranked destinations based on monitoring the network information associated with the second set of destinations; and
cause the traffic in the network to be managed based on updating the second set of ranked destinations.

5. The device of claim 1, wherein, when causing the traffic in the network to be managed, the one or more processors are to one of:
cause the traffic in the network to be managed based on a network configuration protocol (NETCONF),
cause the traffic in the network to be managed based on a border gateway protocol (BGP),
cause the traffic in the network to be managed based on a segment routing protocol, or
cause the traffic in the network to be managed based on a path computation element communication protocol (PCEP).

6. The device of claim 1, wherein the policy information includes information associated with one of:
reducing a cost associated with the network,
conserving resources associated with the network, or
reducing underutilization of the resources associated with the network.

7. The device of claim 1, wherein the one or more processors, when identifying the first set of destinations, are to:
identify the first set of destinations, from a plurality of destinations, based on the first set of destinations handling a majority of network traffic for the network.

8. A non-transitory computer-readable medium storing instructions, the instructions comprising:
one or more instructions that, when executed by one or more processors, cause the one or more processors to:
receive policy information associated with configuring a network;
receive network information associated with the network;
determine, based on the network information, that the policy information is associated with implementation of egress peer engineering techniques or ingress peer engineering techniques for the network; and
perform, when the policy information is associated with implementation of the egress peer engineering techniques, a first set of actions,
where the one or more instructions, that cause the one or more processors to perform the first set of actions, cause the one or more processors to:
identify, based on the network information, a first set of destinations of the network that satisfies a first threshold bandwidth;
monitor first bandwidth utilization by the first set of destinations;
process first information associated with the first set of destinations, with a first model, based on the first bandwidth utilization and based on the egress peer engineering techniques, to generate a first set of ranked destinations; and
provide, to the network, a first set of forwarding rules based on the first set of ranked destinations, the policy information, and the egress peer engineering techniques; or
perform, when the policy information is associated with implementation of the ingress peer engineering techniques, a second set of actions,
where the one or more instructions, that cause the one or more processors to perform the second set of actions, cause the one or more processors to:
identify, based on the network information, a second set of destinations of the network that satisfies a second threshold bandwidth;
identify border network devices, of the network, associated with the second set of destinations;
monitor second bandwidth utilization by the border network devices; and
process second information associated with the second set of destinations, with a second model, based on the second bandwidth utilization by the border network devices and based on the ingress peer engineering techniques, to generate a second set of ranked destinations; and provide, to the network, a second set of forwarding rules based on the second set of ranked destinations, the policy information, and the ingress peer engineering techniques.

9. The non-transitory computer-readable medium of claim 8, wherein the one or more instructions, that cause the one or more processors to perform the first set of actions, cause the one or more processors to:
monitor the network information associated with the first set of destinations;
update the first set of ranked destinations based on monitoring the network information associated with the first set of destinations; and
cause traffic in the network to be managed based on updating the first set of ranked destinations.

10. The non-transitory computer-readable medium of claim 8, wherein the one or more instructions, that cause the one or more processors to perform the second set of actions, cause the one or more processors to:
monitor the network information associated with the second set of destinations;
update the second set of ranked destinations based on monitoring the network information associated with the second set of destinations; and
cause traffic in the network to be managed based on updating the second set of ranked destinations.

11. The non-transitory computer-readable medium of claim 8, wherein the first set of forwarding rules or the second set of forwarding rules are based on at least one of:
a network configuration protocol (NETCONF),
a border gateway protocol (BGP),
a segment routing protocol, or
a path computation element communication protocol (PCEP).

12. The non-transitory computer-readable medium of claim 8, wherein the one or more instructions, that cause the one or more processors to identify the first set of destinations, cause the one or more processors to:
identify the first set of destinations, from a plurality of destinations, based on the first set of destinations handling a majority of network traffic for the network.

13. The non-transitory computer-readable medium of claim 8, wherein the one or more instructions further cause the one or more processors to:
use a machine learning model, trained on past network behavior, to determine first costs and first bandwidths; and
assign, based on output of the machine learning model and the policy information, the first costs and the first bandwidths to the first set of destinations.

14. The non-transitory computer-readable medium of claim 8, wherein the one or more instructions, that cause the one or more processors to determine that the policy information is associated with implementation of the egress peer engineering techniques or the ingress peer engineering techniques, cause the one or more processors to:
process the network information with one or more artificial intelligence models to determine that the policy information is associated with implementation of the egress peer engineering techniques or the ingress peer engineering techniques.

15. A method, comprising:
receiving, by a device, policy information associated with configuring a network;
receiving, by the device, network information associated with the network;
determining, by the device and based on the network information, that the policy information is associated with implementation of ingress peer engineering techniques for the network;
identifying, by the device and based on the network information, a first set of destinations of the network that satisfies a particular threshold bandwidth;
identifying, by the device, border network devices, of the network, associated with the first set of destinations;
assigning, by the device, costs and bandwidths to the border network devices based on the policy information;
monitoring, by the device, bandwidth utilization by the border network devices;
processing, by the device, information associated with the first set of destinations, with a model, based on the bandwidth utilization by the border network devices and based on the ingress peer engineering techniques, to generate a first set of ranked destinations; and
causing, by the device, traffic in the network to be managed based on the first set of ranked destinations and the policy information,
wherein causing the traffic in the network to be managed includes:
providing, to the network, forwarding rules based on the first set of ranked destinations, the policy information, and the ingress peer engineering techniques.

16. The method of claim 15, further comprising:
monitoring the network information associated with the first set of destinations;
updating the first set of ranked destinations based on monitoring the network information associated with the first set of destinations; and
causing the traffic in the network to be managed based on updating the first set of ranked destinations.

17. The method of claim 15, further comprising:
determining, based on the network information, that the policy information is associated with implementation of egress peer engineering techniques for the network;
identifying, based on the network information, a second set of destinations of the network that satisfies the particular threshold bandwidth;
assigning costs and bandwidths to the second set of destinations based on the policy information;
monitoring bandwidth utilization by the second set of destinations;
processing information associated with the second set of destinations, with the model, based on the bandwidth utilization by the second set of destinations, and based on the egress peer engineering techniques, to generate a second set of ranked destinations; and
causing traffic in the network to be managed based on the second set of ranked destinations and the policy information.

18. The method of claim 17, further comprising:
monitoring the network information associated with the second set of destinations;
updating the second set of ranked destinations based on monitoring the network information associated with the second set of destinations; and
causing the traffic in the network to be managed based on updating the second set of ranked destinations.

19. The method of claim 15, wherein the traffic in the network is managed based on one of:
a network configuration protocol (NETCONF),
a border gateway protocol (BGP), a segment routing protocol, or a path computation element communication protocol (PCEP).

20. The method of claim 15, wherein identifying the first set of destinations comprises:

identifying the first set of destinations, from a plurality of destinations, based on the first set of destinations handling a majority of network traffic for the network.

* * * * *